United States Patent [19]

Amano

[11] Patent Number: 5,734,748
[45] Date of Patent: Mar. 31, 1998

[54] CHARACTER PATTERN GENERATION APPARATUS AND METHOD

[75] Inventor: Hiroyuki Amano, Yokohama, Japan

[73] Assignee: Canon Kabushiki Kaisha, Japan

[21] Appl. No.: 362,986

[22] Filed: Dec. 23, 1994

[30] Foreign Application Priority Data

Dec. 30, 1993 [JP] Japan ................... 5-354303
Dec. 14, 1994 [JP] Japan ................... 6-310549

[51] Int. Cl.⁶ ............... G06K 9/00; G06K 9/54; G06F 15/00
[52] U.S. Cl. ............ 382/181; 382/185; 382/300; 395/150; 395/151
[58] Field of Search ............ 395/150, 151; 382/181, 185, 187, 300

[56] References Cited

U.S. PATENT DOCUMENTS

| | | | |
|---|---|---|---|
| 5,016,001 | 5/1991 | Minagawa et al. | 395/142 |
| 5,189,730 | 2/1993 | Kajimoto | 395/151 |
| 5,288,156 | 2/1994 | Hori et al. | 395/102 |
| 5,295,238 | 3/1994 | Dickson | 395/150 |
| 5,355,448 | 10/1994 | Uchino et al. | 395/150 |
| 5,355,449 | 10/1994 | Lung et al. | 395/150 |
| 5,469,513 | 11/1995 | Kurumida | 395/141 |
| 5,473,743 | 12/1995 | Watanabe | 395/151 |

FOREIGN PATENT DOCUMENTS

| | | | |
|---|---|---|---|
| 0357383 | 3/1990 | European Pat. Off. | G06K 15/02 |
| 0398681 | 11/1990 | European Pat. Off. | G06K 15/02 |
| 0469918 | 2/1992 | European Pat. Off. | G06F 15/72 |
| 2221780 | 2/1990 | United Kingdom | H03M 1/00 |

Primary Examiner—Andrew Johns
Assistant Examiner—Monica S. Davis
Attorney, Agent, or Firm—Fitzpatrick, Cella, Harper & Scinto

[57] ABSTRACT

A character pattern generation apparatus generates a character pattern on the basis of font data in a stroke format. A data generation unit generates character data, character element data, or stroke data on the basis of the font data in the stroke format. A storage unit stores the character data, character element data, or stroke data generated by the data generation unit. A discrimination unit discriminates whether character data, character element data, or stroke data corresponding to a character pattern to be generated is stored in the storage unit. When the discrimination unit determines that character data, character element data, or stroke data corresponding to the character pattern to be generated is stored in the storage unit, a character pattern generation unit generates the character pattern on the basis of the character data, character element data, or stroke data stored in the storage unit.

34 Claims, 27 Drawing Sheets

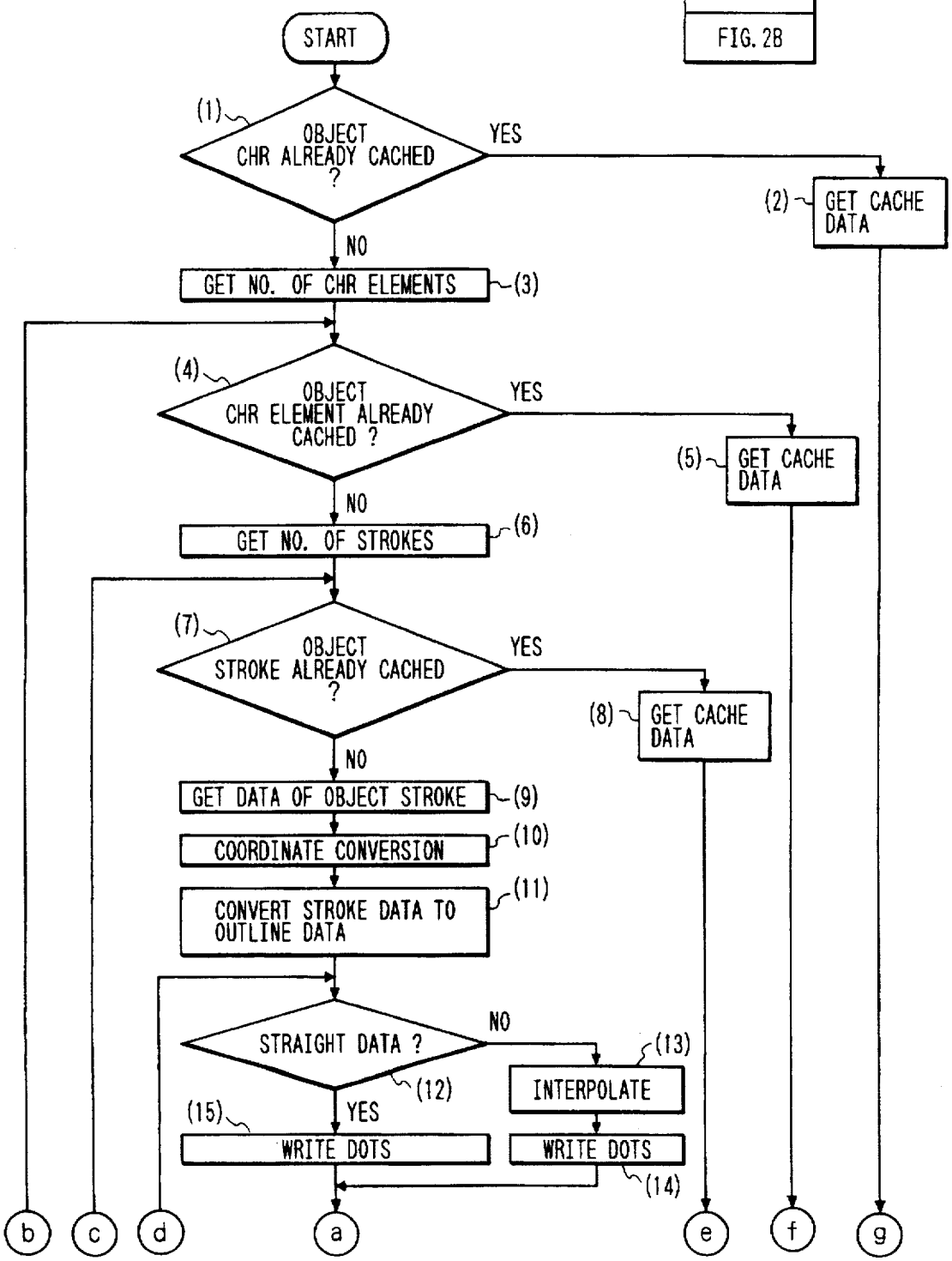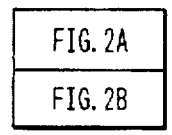

FIG. 6B

OBJECT CHR ELEMENT

| CHR ELEMENT | ID | 扌 |
|---|---|---|
| | PRIORITY | 1005 |
| | | 5 |

B1

CHR ELEMENT CACHE BUFFER

| PRIORITY | 2 | 3 | 10 | 12 | 23 |
|---|---|---|---|---|---|
| ID | 1002 | 1003 | 1010 | 1012 | 1023 |
| CHR ELEMENT | 亻 | 才 | 才 | 扌 | 馬 |

B2

→

| PRIORITY | 2 | 3 | 5 | 10 | 12 |
|---|---|---|---|---|---|
| ID | 1002 | 1003 | 1005 | 1010 | 1012 |
| CHR ELEMENT | 亻 | 才 | 扌 | 才 | 扌 |

OBJECT CHR

| CHR | ID | 打 |
|---|---|---|
| | PRIORITY | 2025 |
| | | 25 |

CHR CACHE BUFFER

| PRIORITY | 5 | 11 | 15 | 28 | 34 |
|---|---|---|---|---|---|
| ID | 2005 | 2011 | 2015 | 2028 | 2034 |
| CHR | 使 | 行 | 横 | 和 | 訳 |

→

| PRIORITY | 5 | 11 | 15 | 25 | 28 |
|---|---|---|---|---|---|
| ID | 2005 | 2011 | 2015 | 2025 | 2028 |
| CHR | 使 | 行 | 横 | 打 | 和 |

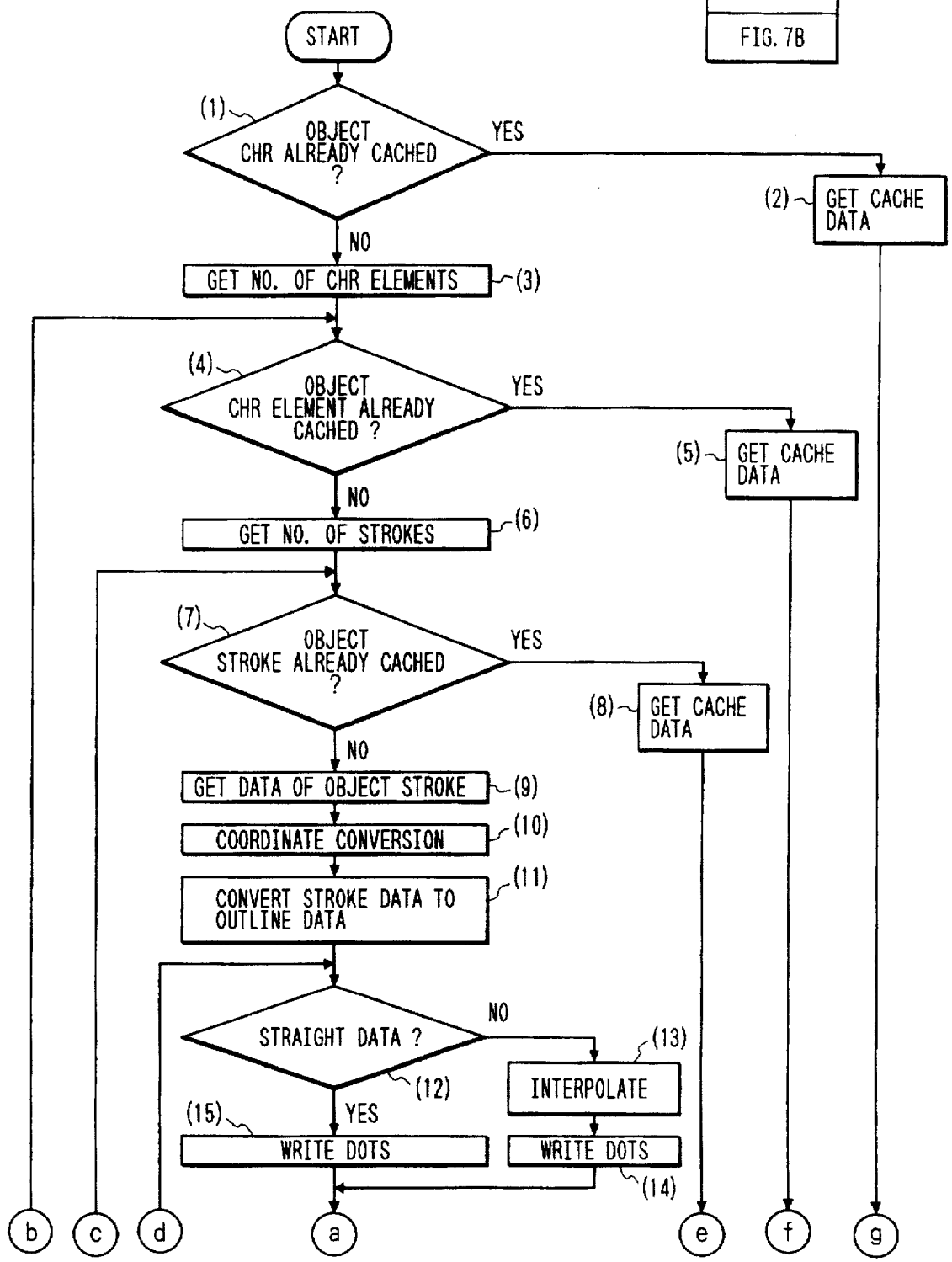

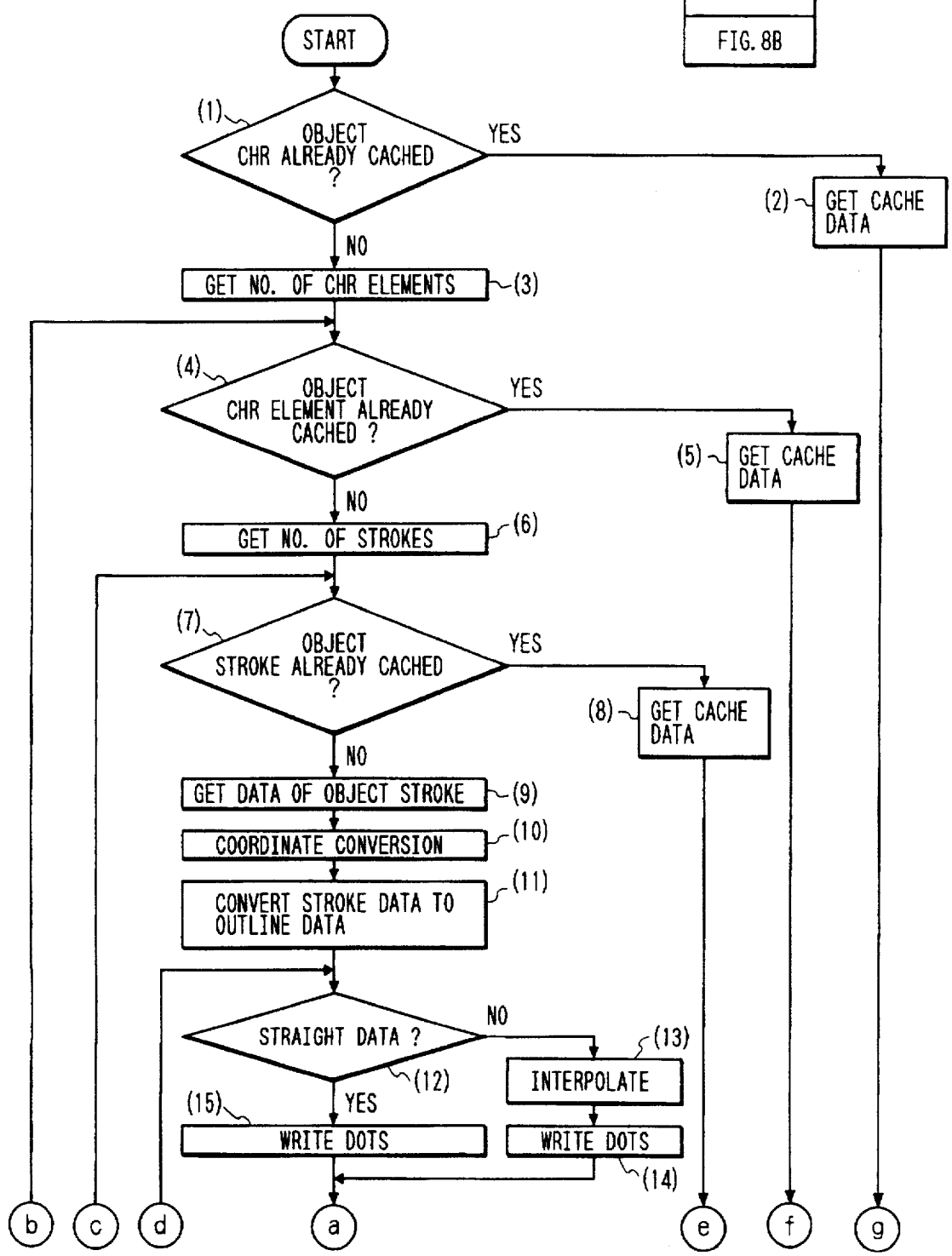

EVEN ODD 0  1  2  1  0
NON ZERO WINDING

| OBJECT CHR | CHR | CHR ELEMENT | STROKE |
|---|---|---|---|
| 木 | 木 | 木 | 一 ノ 丶 |
| 保 | 保 | 亻 口 木 | 一 ノ 丶 |

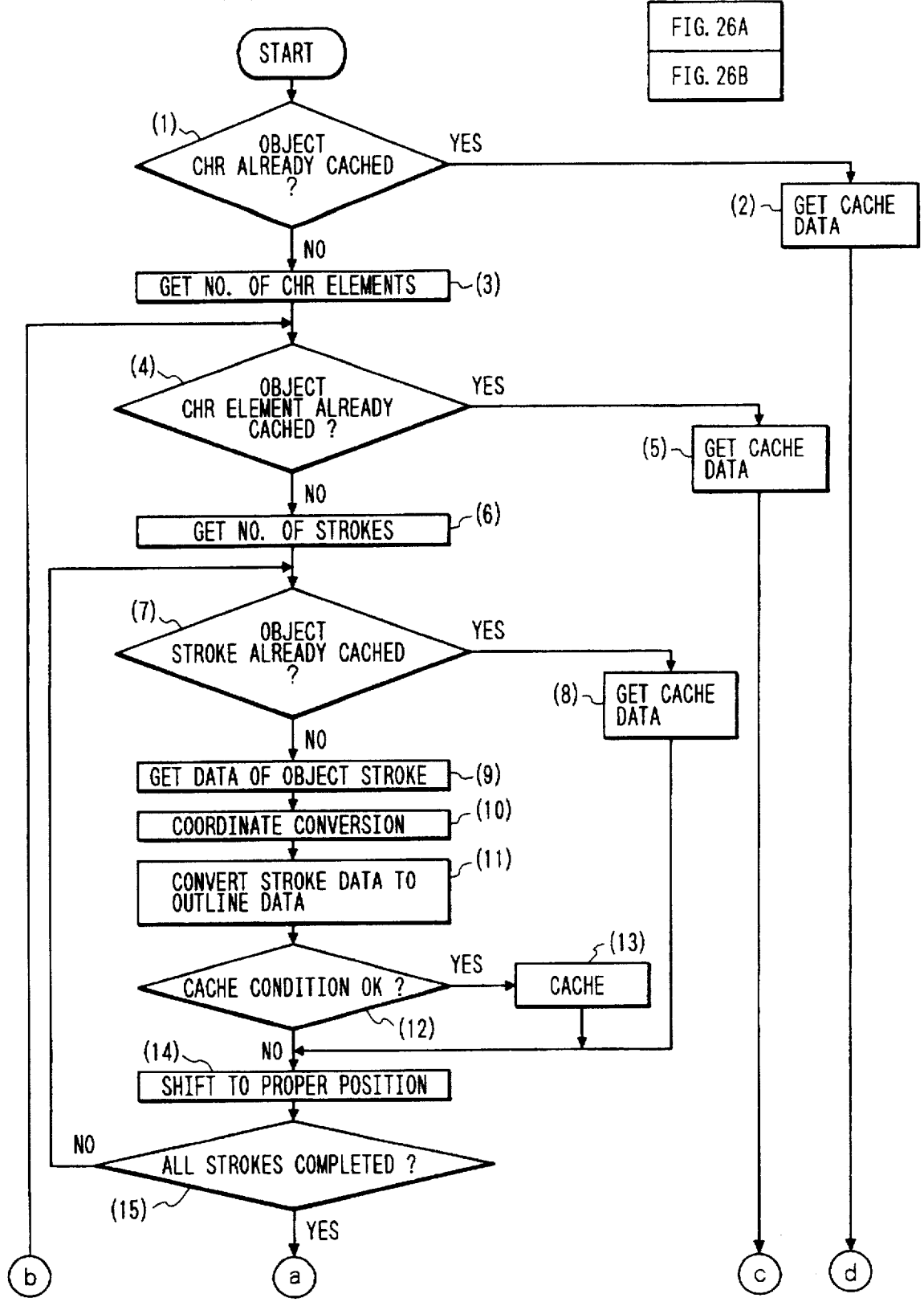

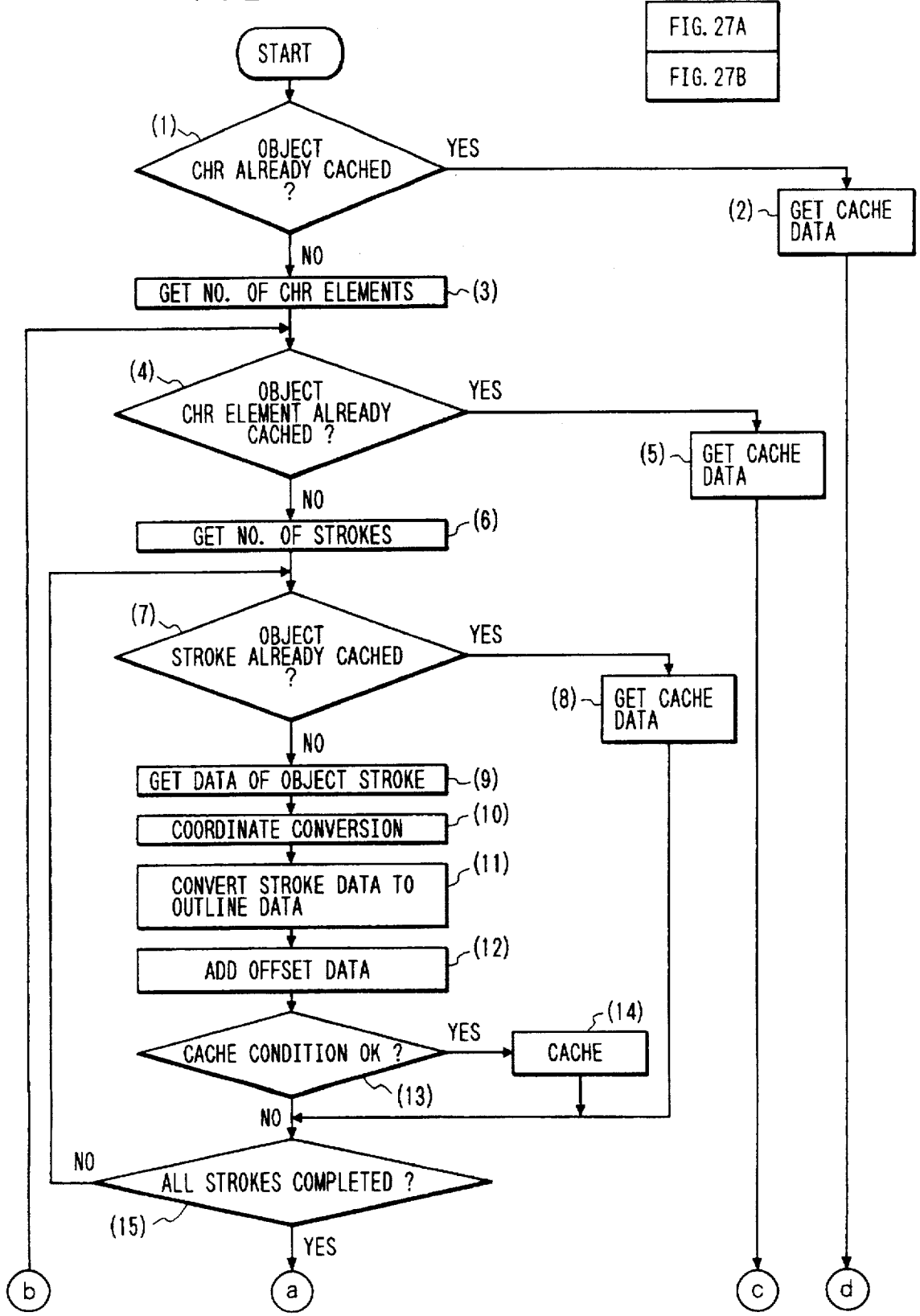

| FIG. 28A |
| FIG. 28B |

CHARACTER PATTERN GENERATION APPARATUS AND METHOD

BACKGROUND OF THE INVENTION

1. Field of the Invention

The present invention relates to a character pattern generation apparatus and method, which have a plurality of character pattern process resources for generating a character pattern by analyzing input character information.

2. Related Background Art

Conventionally, a character pattern generation process in a character pattern generation apparatus of this type is achieved by outline generation for obtaining an outline for one character by a calculation from a control point. Currently, since a large number of different kinds of type faces must be used, a huge amount of font data must be held to perform character generation with this method, and it is of urgent necessity to provide a data amount reduction method.

In order to prevent this problem, a stroke synthesis method which has data in units of strokes or character elements, and generates a character by synthesizing these data has been proposed. Since identical strokes or character elements can be applied to a large number of kinds of characters, the data amount can be reduced as compared to the above-mentioned method.

Conventionally, in outline font pattern development using hardware, font data, a hinting section, an interpolation section, a painting section, and the like are prepared in correspondence with a predetermined method of an apparatus, or an apparatus is designed in correspondence with font data, a hinting section, an interpolation section, a painting section, and the like, which are prepared in advance.

However, when a long document is to be created, identical stroke or character element data must be read out in units of characters to generate patterns, resulting in repetition of identical jobs.

Since an apparatus must be designed in correspondence with font data, a hinting section, an interpolation section, a painting section, and the like, which are prepared in advance, this results in much labor and an increase in price.

Furthermore, when a large number of different kinds of type faces are to be used, the amount of font data becomes huge, and a large memory capacity is required.

SUMMARY OF THE INVENTION

It is an object of an embodiment of the present invention to provide a character pattern generation apparatus and method, in which data generated in association with characters, character elements, and strokes with high used frequencies are cached and preserved to prevent repetition of identical jobs and to simplify a series of jobs upon generation of character patterns, character pattern process resources such as hinting, interpolation, painting, and the like are shared, and different character pattern processes are performed in correspondence with character information, thereby eliminating extra labor due to a difference between specifications of font data and an apparatus.

A character pattern generation apparatus according to the present invention comprises generation means for generating a stroke, character element, and character pattern, discrimination means for discriminating whether or not the stroke, character element, and character pattern generated by the generation means are to be cached in a storage device, cache means for caching the generated stroke, character element, and character pattern in the storage device on the basis of a discrimination result of the discrimination means, and read-out means for reading out the stroke, character element, and character pattern cached in the storage device by the cache means.

A character pattern generation apparatus according to the present invention comprises information generation means for analyzing input character information and generating a flag for selecting character pattern process resources to be utilized to generate a character pattern, and character pattern process means for generating a character pattern by selecting different character pattern process resources on the basis of the flag generated by the information generation means.

In the character pattern generation apparatus according to the present invention, the character pattern process resources include a plurality of font process means for processing character pattern generation in units of strokes or outlines, a plurality of hinting means for performing coordinate conversion for improving quality of a character by a method determined by the flag, a plurality of interpolation means for generating a curve based on a curve characteristic determined by the flag, and generating an outline of a closed region, and a plurality of painting means for generating a bit map by painting the closed region generated by the method determined by the flag.

According to the present invention, the cache means caches generated stroke, character element, and pattern data, and the cached stroke, character element, and pattern data are synthesized to generate character patterns, thereby remarkably decreasing the generation frequencies of stroke, character element, and pattern data with high used frequencies, and efficiently generating character patterns.

According to the present invention, the information generation means analyzes input character information to generate a flag for selecting character pattern process resources to be utilized for generating a character pattern, and the character pattern process means selects different character pattern process resources on the basis of the generated flag to generate a character pattern, thus achieving different character pattern processes using common character pattern process resources which do not depend on input character information.

According to the present invention, a character pattern is generated by selecting different character pattern process resources by the character pattern process means based on the generated flag from a plurality of font process means for processing character pattern generation in units of strokes or outlines, a plurality of hinting means for performing coordinate conversion for improving quality of a character by a method determined by the flag, a plurality of interpolation means for generating a curve based on a curve characteristic determined by the flag, and generating an outline of a closed region, and a plurality of painting means for generating a bit map by painting the closed region generated by the method determined by the flag. Thus, different character pattern processes can be achieved using common character pattern process resources which do not depend on input character information.

Other objects and features of the present invention will become apparent from the following specification and the accompanying drawings.

BRIEF DESCRIPTION OF THE DRAWINGS

FIGS. 6A to 6C are views showing the state of a cache buffer;

FIG. 23 is a flow chart showing an example of another character pattern generation sequence in the character pattern generation apparatus according to the present invention;

DESCRIPTION OF THE PREFERRED EMBODIMENTS

[First Embodiment]

Figure 1:
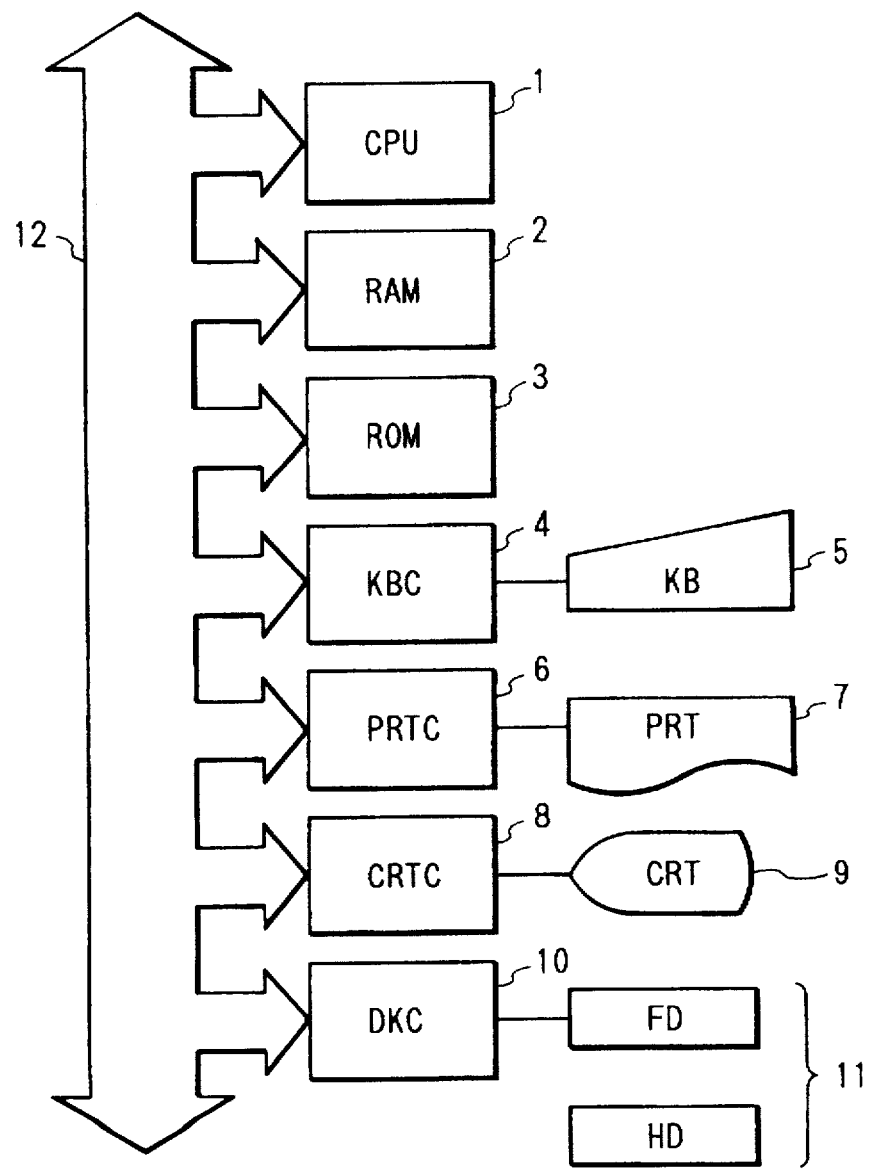
FIG. 1 is a block diagram for explaining the arrangement of a character pattern generation apparatus according to the first embodiment of the present invention.

FIG. 1 is a block diagram for explaining the arrangement of a character pattern generation apparatus according to the first embodiment of the present invention. The character pattern generation apparatus of this embodiment is designed to be applicable to Japanese wordprocessors, work stations, computer systems, printers, display apparatuses, and the like.

Referring to FIG. 1, a central processing unit (CPU) 1 performs control of the entire apparatus and calculation processes. A random-access memory (RAM) 2 is an area on which programs and data are loaded and executed in units of various processes. A read-only memory (ROM) 3 is a storage area of system control programs, programs associated with the flow chart to be described later, font data, and the like.

A keyboard controller (KBC) 4 receives data key-input from a keyboard (KB) 5, and transfers the received data to the CPU. A printer controller (PRTC) 6 controls a printer apparatus (PRT 7; a dot printer such as a laser beam printer, an ink-jet printer, or the like). A display controller (CRTC) 8 controls a display apparatus (CRT) 9, and displays data sent from a disk controller (DKC) 10 on the display apparatus 9.

The disk controller (DKC) 10 controls, e.g., data transfer. An external storage device 11 such as a floppy disk device (FD) or a hard disk device (HD) stores programs and data, and loads them onto the RAM 2 upon execution of them as needed. A system bus 12 serves as a data transfer path among the above-mentioned constituting elements.

In the character pattern generation apparatus with the above-mentioned arrangement, a cache control means (CPU 1) individually caches generated stroke, character element, character pattern, or coordinate data in a cache buffer area of a storage device (RAM 2) (a detailed sequence will be described later with reference to flow charts shown in FIGS. 2A and 2B), and a character pattern is generated by synthesizing patterns based on the cached stroke, character element, character pattern, or coordinate data, thereby remarkably decreasing the generation frequencies of stroke, character element, and pattern data with high use frequencies, and efficiently generating character patterns.

Figure 2B:
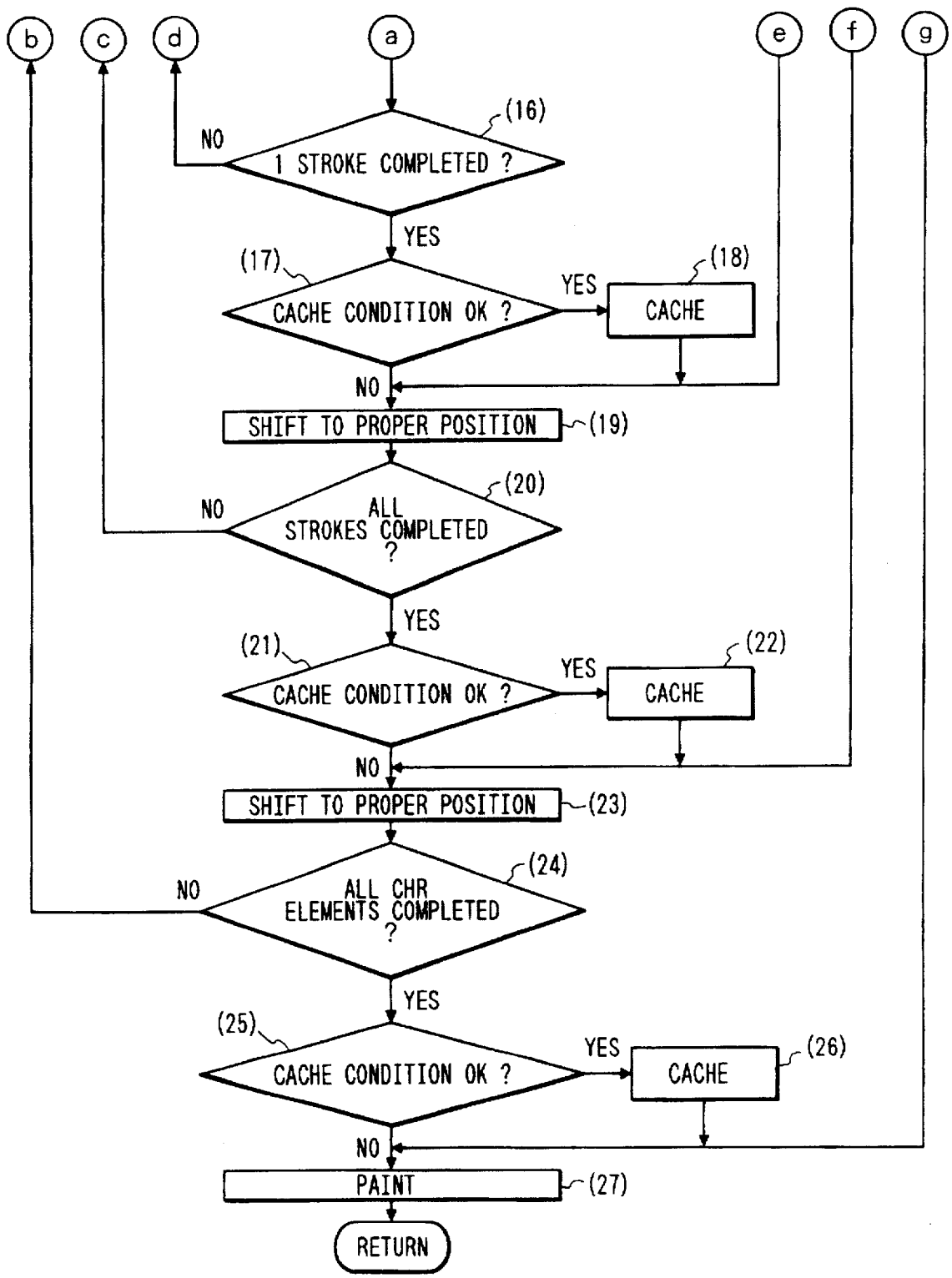
FIG. 2 is comprised of FIG. 2A and FIG. 2B showing flow charts for explaining a first character pattern generation process sequence in the character pattern generation apparatus according to the first embodiment of the present invention.

FIGS. 2A and 2B show flow charts for explaining a first character pattern generation process sequence in the character pattern generation apparatus according to the first embodiment of the present invention. Note that (1) to (27) indicate steps.

In step (1), it is checked by confirming a cache buffer based on ID data if outline coordinate data of a retrieved object character to be developed has already been cached as a character. Note that the outline coordinate data is stored as X- and Y-coordinate values. If corresponding character data is stored in the cache buffer, it is determined that the coordinate data has already been cached, and the flow advances to step (2) to get the outline coordinate data of the object character from the cache buffer. Thereafter, the flow jumps to step (27).

On the other hand, if it is determined in step (1) that corresponding character data is not stored in the cache buffer, it is determined that the coordinate data is not cached yet, and the flow advances to step (3) to get data of the number of character elements constituting the character and their types.

The flow advances to step (4) to check by confirming the cache buffer based on ID data if outline coordinate data corresponding to an object character element of the retrieved character elements has already been cached. At this time, an object character element is selected from those constituting a character in an order of making strokes in this embodiment. However, the present invention is not limited to this order.

If corresponding character element data is stored in the cache buffer, it is determined that the outline coordinate data has already been cached, and the flow advances to step (5) to get the outline coordinate data of the object character element from the cache buffer. Thereafter, the flow jumps to step (23).

If it is determined in step (4) that corresponding character element data is not stored in the cache buffer, it is determined that the outline coordinate data is not cached yet, and the flow advances to step (6) to get data of the number of strokes constituting the object character element and their types.

The flow then advances to step (7) to check by confirming the cache buffer based on ID data if outline coordinate data of an object stroke has already been cached. At this time, an object stroke is selected from those constituting the character element in an order of making strokes in this embodiment. However, the present invention is not limited to this order.

If corresponding stroke data is stored in the cache buffer, it is determined that the outline coordinate data has already been cached, and the flow advances to step (8) to get outline coordinate data of the object stroke from the cache buffer. Thereafter, the flow advances to step (19).

If it is determined in step (7) that corresponding stroke data is not stored in the cache buffer, it is recognized that the outline coordinate data is not cached yet, and the flow advances to step (9) to get outline coordinate data of the object stroke. The flow advances to step (10), and coordinate conversion of the got coordinate data (control point data) in a stroke format upon enlargement/reduction of data is performed.

Figure 3:
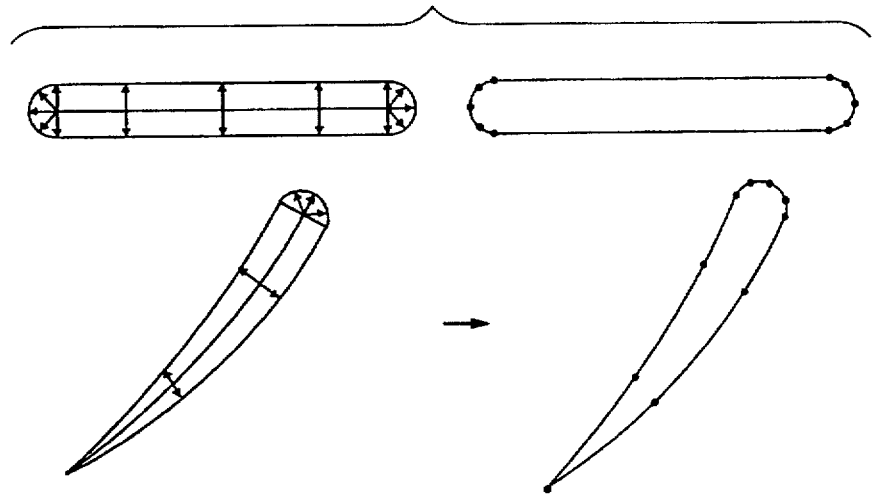
FIG. 3 is a view for explaining a conversion state from coordinate data to outline information in the character pattern generation apparatus according to the present invention.

Since the coordinate data in the stroke format is information defined by "core line"+"thickness", it is converted into coordinate data (control point data) in an outline format in step (11), as shown in FIG. 3.

It is then checked in step (12) if the converted data is straight data. If N (NO) in step (12), it is determined that the converted data is curve data, and the curve data is interpolated by a predetermined curve interpolation method in step (13). In step (14), dots are written.

On the other hand, if it is determined in step (12) that the converted data is straight data, dots are written in step (15). It is then checked in step (16) if dots for one outline of the object stroke data have already been written. If N in step (16), the flow returns to step (12); otherwise, the flow advances to step (17) to test if this stroke satisfies a cache condition. The test process will be described later with reference to FIGS. 4 and 5.

If it is determined in step (17) that the cache condition is satisfied, the flow advances to step (18) to cache the stroke data. The flow then advances to step (19), and the generated outline coordinate data of the object stroke or the outline coordinate data retrieved in step (8) is converted into outline coordinate data corresponding to a development position in the object character element.

The flow advances to step (20) to check if dots of all strokes constituting the character element have already been written. If N in step (20), the flow returns to step (7) to perform the same operation for the next object stroke.

On the other hand, if Y (YES) in step (20), it is tested in step (21) if this character element satisfies a cache condition, as in step (17). If Y in step (21), the flow advances to step (22) to cache data.

The flow advances to step (23), and the generated outline coordinate data of the object character element or the outline coordinate data retrieved in step (5) is converted into outline coordinate data corresponding to a development position in the object character. In step (24), it is checked if dots of all character elements constituting the character have already been written. If N in step (24), the flow returns to step (4) to perform the same operation for the next object character element.

On the other hand, if Y in step (24), it is tested in step (25) if this character satisfies a cache condition, as in steps (17) and (21).

If Y in step (25), the flow advances to step (26) to cache data. The generated bit map for one character or outline coordinate data got in step (2) is painted in step (27) to complete pattern generation.

A character pattern generated based on the above-mentioned flow chart is printed or displayed by the printer apparatus 7 or the display apparatus 9.

The cache condition test process in step (17), (21), and (25) in FIG. 2 will be explained below with reference to FIGS. 4 and 5 and FIGS. 6A to 6C.

Figure 4:
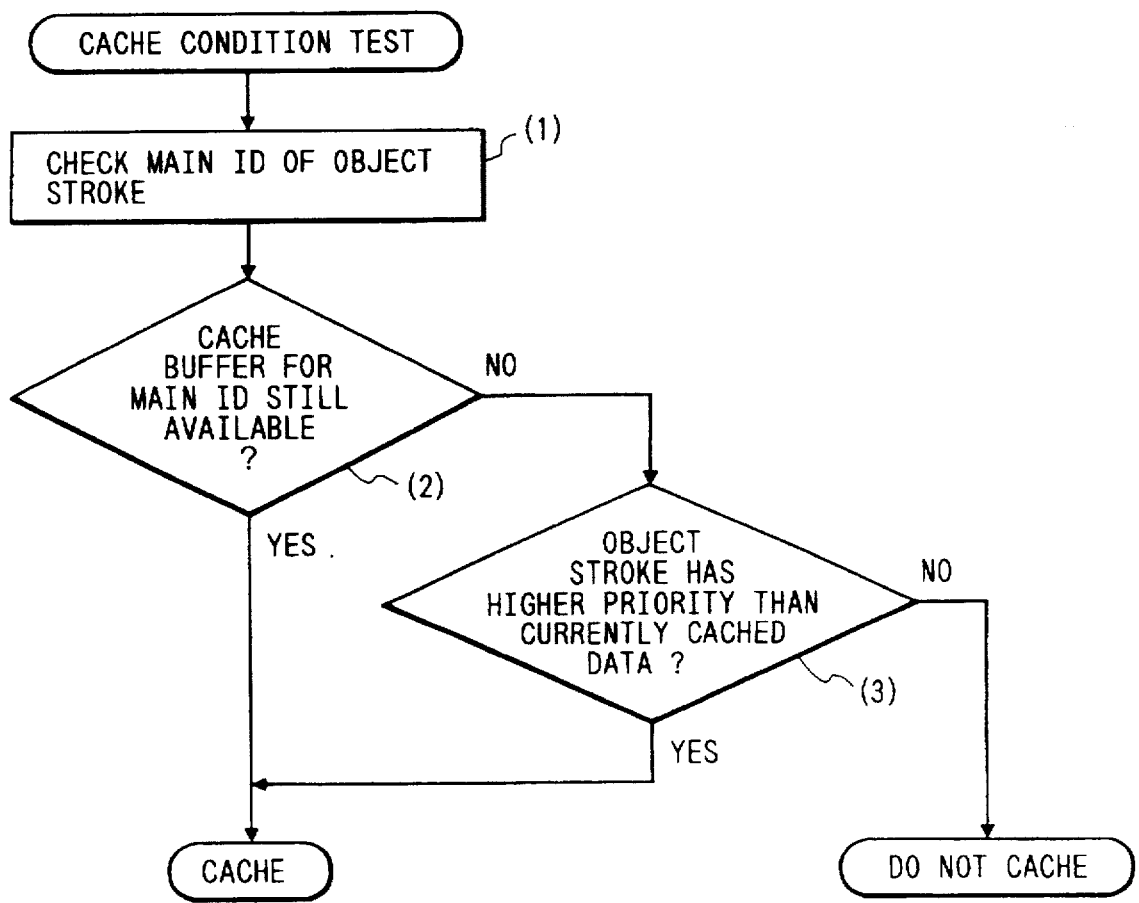
FIG. 4 is a flow chart showing an example of a cache condition test process sequence in the character pattern generation process shown in FIG. 2.

FIG. 4 is a flow chart showing an example of the cache condition test process in the character pattern generation process shown in FIG. 2. Note that (1), (2), and (3) indicate steps.

In step (1), main ID data of an object stroke is checked. The flow advances to step (2) to check if the cache buffer corresponding to the main ID data checked in step (1) is still available. If N in step (2), it is checked in step (3) if the priority of the object stroke is higher than that of data already stored in the cache buffer. If data with priority lower than that of data of the object stroke is not stored in the cache buffer, the object stroke is not cached. However, if at least one item of data with priority lower than that of data of the object stroke is stored in the cache buffer, the data with lowest priority of the stored data is deleted from the cache buffer, and the data of the object stroke is stored in the cache buffer.

Note that the main ID data in this embodiment indicates basic types of strokes such as a horizontal bar, vertical bar, right slant stroke, left slant stroke, dot, hook stroke, and the like. A sub-ID data is an ID assigned to distinguish data having the same main ID but different angles or length from one another.

Note that data of a character element is cached based on main ID data in this embodiment. However, data of a character element may be cached in the same manner as a stroke as long as the cache capacity allows.

Figure 5:
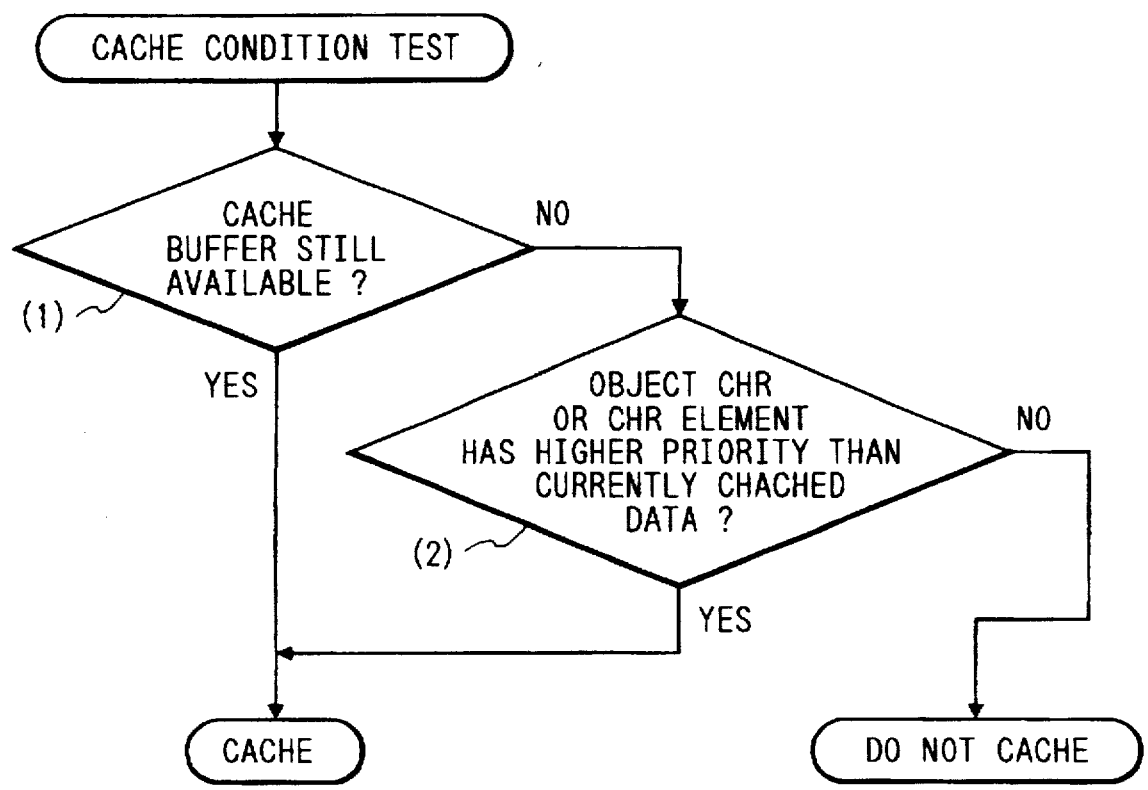
FIG. 5 is a flow chart showing an example of a cache condition test process sequence in the character pattern generation process shown in FIG. 2.
Figure 6A:
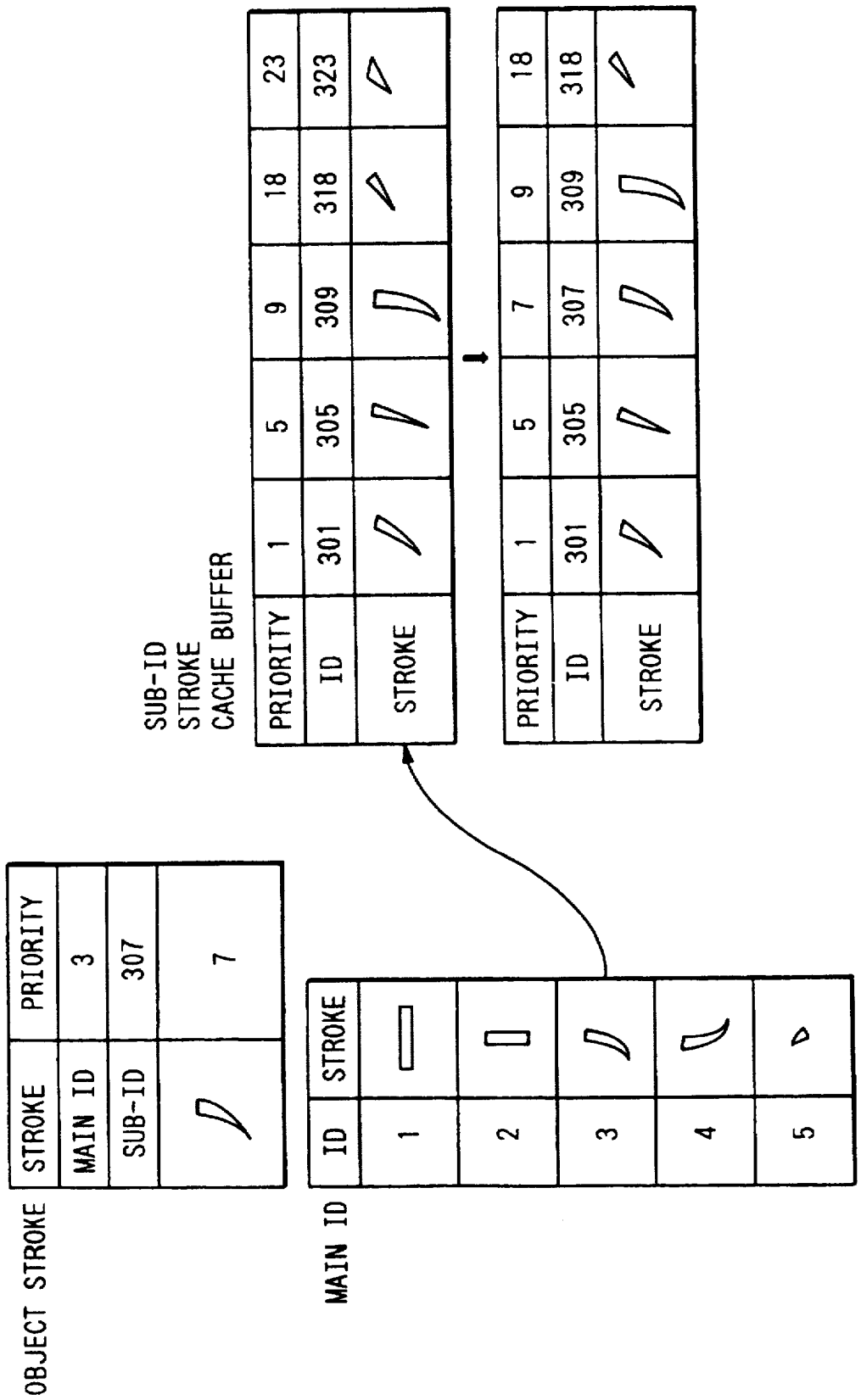

FIG. 5 is a flow chart showing an example of the cache condition test process sequence in the character pattern generation process shown in FIG. 2. Note that (1) and (2) indicate steps. FIGS. 6A to 6C show the states of the cache buffer on the RAM 2 shown in FIG. 1. FIG. 6A shows the state of a stroke cache buffer, FIG. 6C shows the state of a character cache buffer, and FIG. 6B shows the state of a character element cache buffer.

In step (1), it is checked if the buffer for storing cached character or character element data is already full of data.

If the buffer is already full of data, it is checked in step (2) if the priority of an object character or character element is higher than that of data stored in the cache buffer.

If data with priority lower than that of the object character or character element is not stored in the cache buffer, the object character or character element is not cached.

However, if at least one data with priority lower than that of the object character or character element is stored in the cache buffer, data with lowest priority in the cache buffer is deleted from the cache buffer, and the data of the object character or character element is stored in the cache buffer.

With this process, in the state of the character cache buffer shown in FIG. 6C, upon process of an object character "打" with priority "25", in step (17), a character "抗" with priority "34" determined to be lower than that of the object character in step (2) shown in FIG. 5 is deleted, and the object character "打" with priority "25" is registered at a corresponding priority position.

Similarly, in the state of the character element cache buffer shown in FIG. 6B, upon process of an object character element B1 with priority "5", in step (17), a character element B2 with priority "23" determined to be lower than that of the object character element in step (2) shown in FIG. 5 is deleted, and the object character element B1 with priority "5" is registered at a corresponding priority position.

In the above embodiment, outline coordinate data of strokes and character elements are cached. However, in a sequence to be described below, not only outline coordinate data but also an offset value to be added upon development in the above embodiment are cached.

More specifically, when caching is controlled to also cache position information indicating the development position of a stroke in a corresponding character element or the development position of a character element in a corresponding character, a process for shifting developed cached data by an offset value can be omitted, and the character pattern generation process can be executed at higher speed. This process will be described in detail below with reference to flow charts shown in FIGS. 7A and 7B.

Figure 7B:
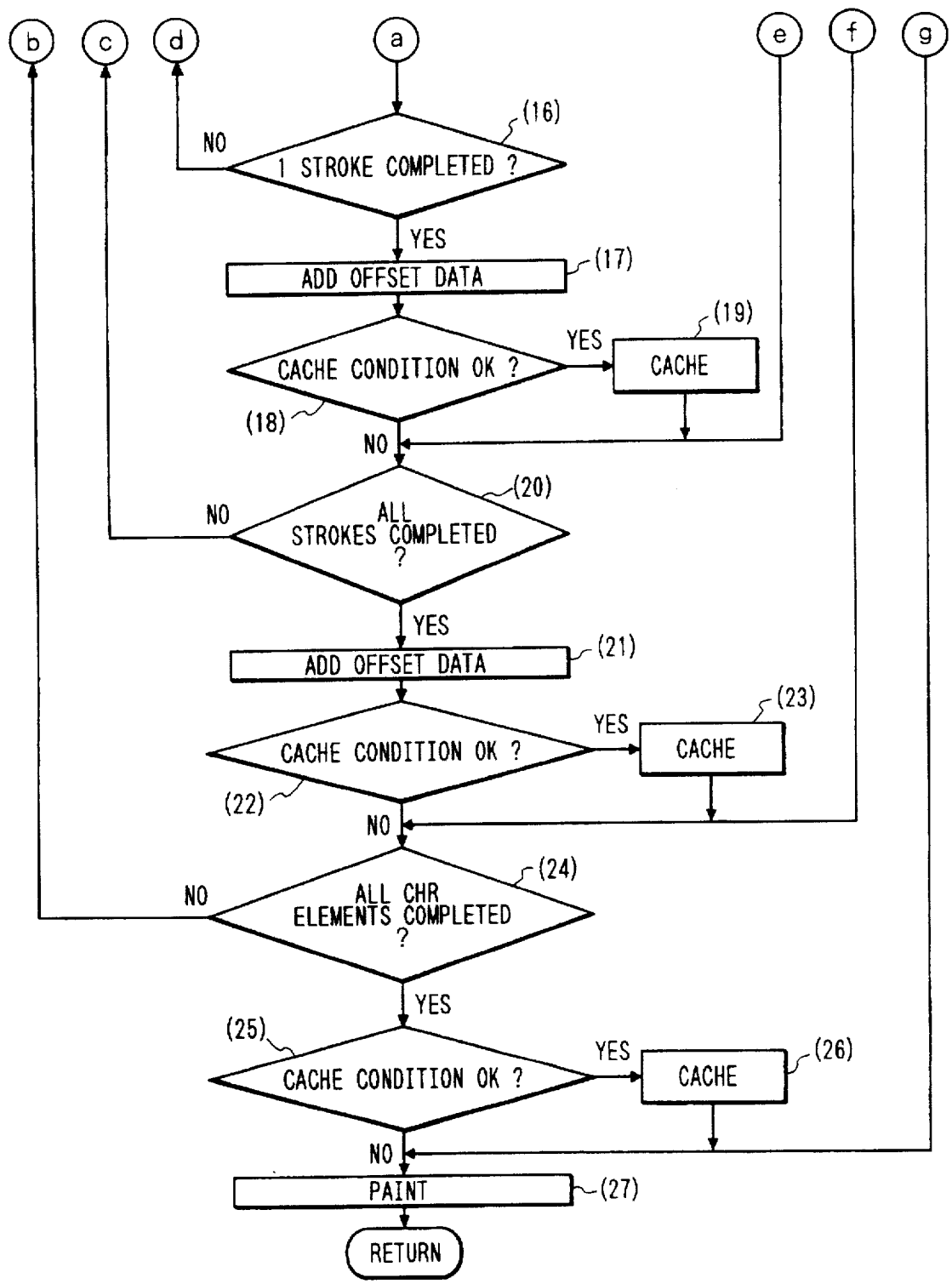
FIG. 7 is comprised of FIG. 7A and FIG. 7B showing flow charts for explaining a second character pattern generation process sequence in the character pattern generation apparatus according to the first embodiment of the present invention.

FIGS. 7A and 7B show flow charts for explaining a second character pattern generation process sequence in the character pattern generation apparatus according to the first embodiment of the present invention. Note that (1) to (27) indicate steps.

Note that steps (1) to (16) are the same as those in FIG. 2 showing the above embodiment, and a detailed description thereof will be omitted.

More specifically, it is checked if outline coordinate data corresponding to an input character has been cached. If the coordinate data has been cached, the cached data is used; otherwise, it is checked if outline coordinate data corresponding to one of character elements constituting the character has been cached.

If outline coordinate data corresponding to one of character elements constituting the character has been cached, the cached data is used; otherwise, it is checked if outline coordinate data corresponding to one of strokes constituting one of the character elements has been cached. If the outline coordinate data has been cached, the cached data is used; otherwise, data of the corresponding stroke is got to generate outline coordinate data.

In step (17), an offset amount to the development position of the stroke in an object character element is added to the outline coordinate data of the stroke generated as described above. In step (18), it is checked if the data is to be cached in the same manner as in the above embodiment. If data is to be cached, the data is cached in step (19).

In this manner, if it is determined in step (20) that one character element is generated, an offset amount to the development position of the character element in an object character is added to data of the generated character element in step (21). It is checked in step (22) if the data is to be cached. If the data is to be cached, the flow advances to step (23) to cache the data. The processes in step (24) and subsequent steps are the same as those in step (24) and subsequent steps in the above embodiment.

In the above embodiment, the cache buffers are assured on the RAM 2 shown in FIG. 1. However, in a sequence to be described below, the cache buffers may be assured on the external storage device 11 such as a hard disk or a floppy disk to process data, as shown in flow charts in FIGS. 8A and 8B.

Figure 8B:
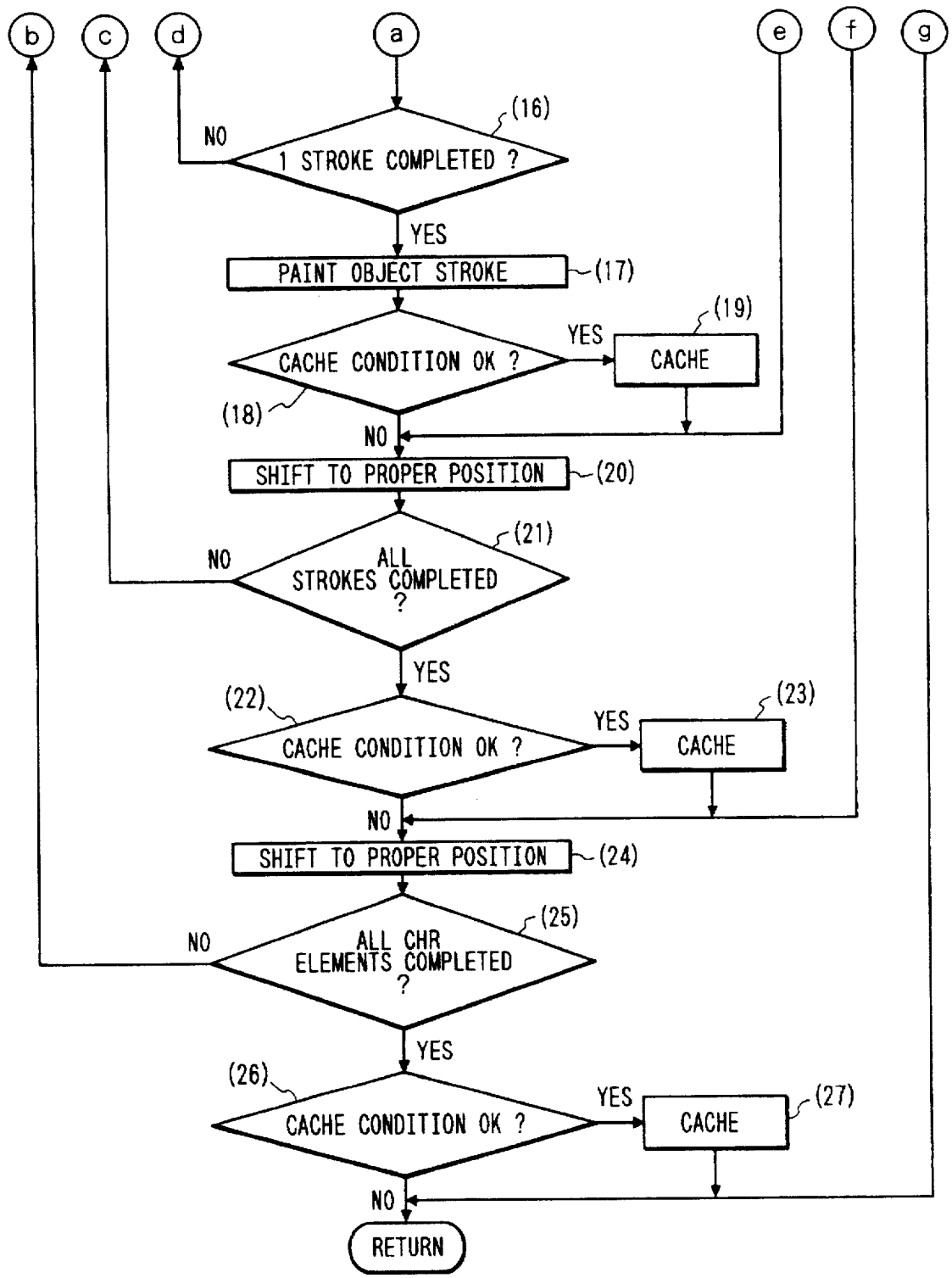
FIG. 8 is comprised of FIG. 8A and FIG. 8B showing flow charts for explaining a third character pattern generation process sequence in the character pattern generation apparatus according to the first embodiment of the present invention.

FIGS. 8A and 8B show flow charts of a third character pattern generation process sequence in the character pattern generation apparatus according to the first embodiment of the present invention. Note that (1) to (27) indicate steps.

In step (1), when data of an object character to be developed is retrieved, it is checked by confirming the cache buffer based on ID data if the data has already been cached as a character. If corresponding character data is stored in the cache buffer, the flow advances to step (2), bit map data is retrieved from the cache buffer on the external storage device 11 shown in FIG. 1, and the flow jumps to step (27), thus ending the generation process of the object character.

On the other hand, if it is determined in step (1) if corresponding character data is not stored in the cache buffer, the flow advances to step (3) to get data of the number of character elements constituting the character and their types.

The flow advances to step (4) to check by confirming the cache buffer based on ID data if data of an object character element has already been cached. At this time, an object character element is selected from those constituting a character in an order of making strokes in this sequence. However, the present invention is not limited to this order.

If corresponding character element data is stored in the cache buffer, the flow advances to step (5) to get bit map data from the cache buffer on the external storage device 11 shown in FIG. 1. Thereafter, the flow jumps to step (24).

If it is determined in step (4) that corresponding character element data is not stored in the cache buffer, the flow advances to step (6) to get data of the number of strokes constituting the object character element and their types. The flow then advances to step (7) to check by confirming the cache buffer based on ID data if data of an object stroke has already been cached.

At this time, an object stroke is selected from those constituting the character element in an order of making strokes in this sequence. However, the present invention is not limited to this order.

If corresponding stroke data is stored in the cache buffer, the flow advances to step (8) to get bit map data from the cache buffer on the external storage device 11 shown in FIG. 1. Thereafter, the flow jumps to step (20). However, if it is determined in step (7) that corresponding stroke data is not stored in the cache buffer, the flow advances to step (9) to get coordinate data in the stroke format of the object stroke.

The flow advances to step (10) to perform coordinate conversion of the got coordinate data upon enlargement/reduction of the data.

Since the coordinate data in the stroke format is information defined by "core line"+"thickness", it is converted into coordinate data (control point data) in an outline format in step (11), as shown in FIG. 3. It is then checked in step (12) if the converted data is straight data. If N in step (12), it is determined that the converted data is curve data, and the curve data is interpolated by a predetermined curve interpolation method in step (13). In step (14), dots are written.

On the other hand, if it is determined in step (12) that the converted data is straight data, dots are written in step (15). It is then checked in step (16) if dots for one outline of the object stroke data have already been written. If N in step (16), the flow returns to step (12); otherwise, the flow advances to step (17) to paint the object stroke.

The flow then advances to step (18) to test if this stroke satisfies the cache condition, as described above.

It is checked in step (2) (FIG. 4) or (1) (FIG. 5) if the buffer for storing cached characters, character elements, or strokes is full of data. If the buffer is already full of data, it is checked in step (3) (FIG. 4) or (2) (FIG. 5) if the priority of data of the object character, character element, or stroke is higher than that of data stored in the cache buffer.

If data with priority lower than that of data of the object character, character element, or stroke is not stored in the cache buffer, the object character, character element, or stroke is not cached.

However, if at least one data with priority lower than that of data of the object character, character element, or stroke is stored in the cache buffer, data with lowest priority is deleted from the cache buffer, and the data of the object character, character element, or stroke is stored in the cache buffer.

If it is determined in step (18) that the cache condition is satisfied, the flow advances to step (19) to cache data. The flow then advances to step (20), and the generated bit map data of the object stroke or the bit map data got in step (8) is converted into bit map data at a development position in an object character element. The flow advances to step (21) to check if bit map generation and synthesis of all strokes constituting the object character element have been completed.

If N in step (21), the flow returns to step (7) to perform the same operation for the next object stroke. However, if Y in step (21), it is checked in step (22) if this character element satisfies the cache condition, as in step (18). If Y in step (22), the flow advances to step (23) to cache data.

The flow advances to step (24), and the generated bit map data of the object character element or the bit map data got in step (5) is converted into bit map data at a development position in an object character.

It is then checked in step (25) if bit map generation and synthesis of all character elements constituting a character have been completed. If N in step (25), the flow returns to step (4) to perform the same operation for the next object character element. However, if Y in step (25), it is checked in step (26) if this character satisfies the cache condition, as in steps (18) and (22). If Y in step (26), the flow advances to step (27) to cache data. In this manner, pattern generation of the object character is completed.

In the above sequence, the bit map data of strokes and character elements are cached in the external storage device 11. Not only bit map data but also an offset value to be added upon development may be cached together.

More specifically, caching may be controlled to also cache position information indicating the development position of a stroke in a corresponding character element or the development position of a character element in a corresponding character, and a process for shifting data by an offset after development of cached data may be omitted (as will be described in detail below with reference to FIGS. 9A and 9B).

Figure 9A:
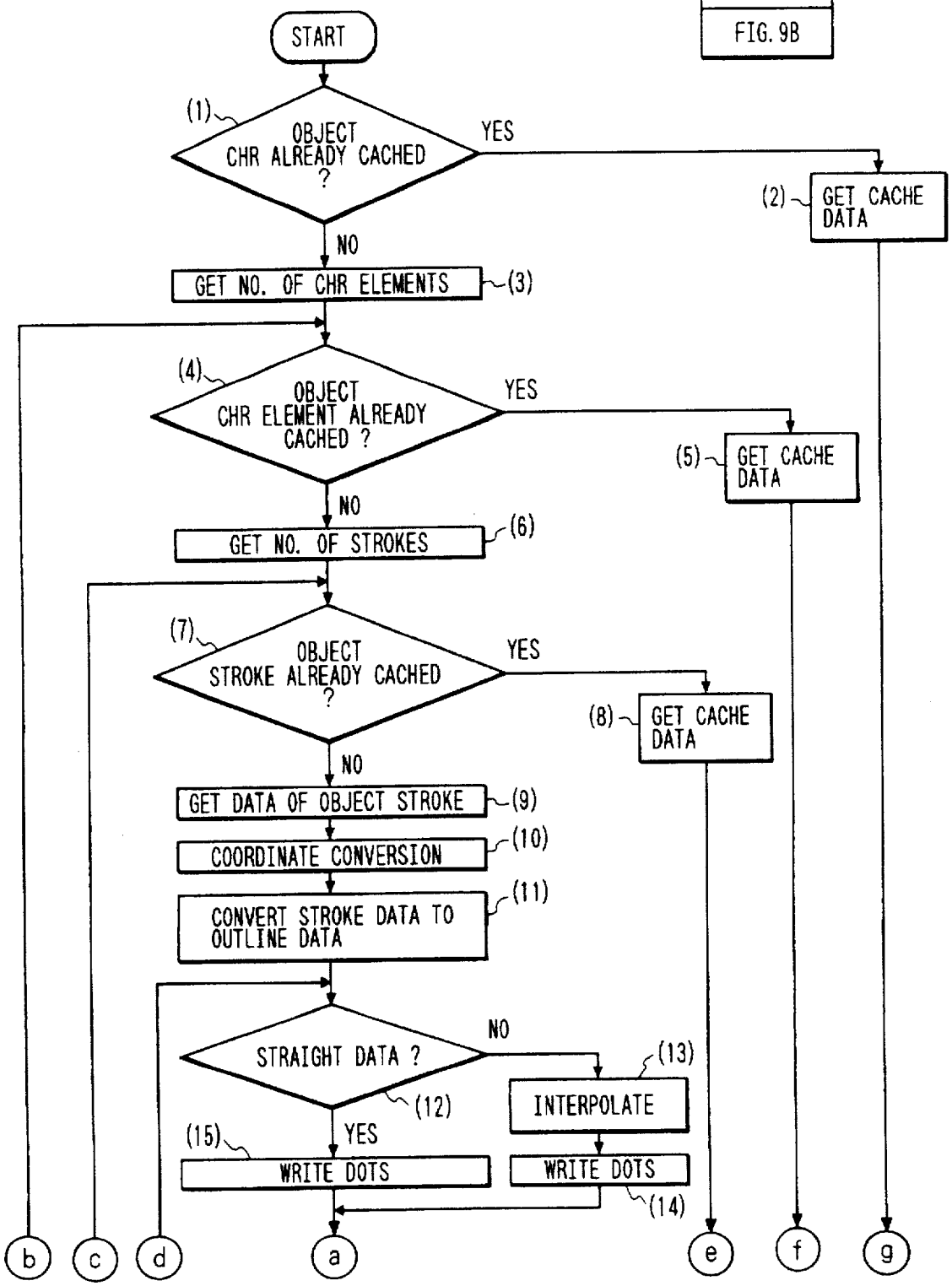
FIG. 9 is comprised of FIG. 9A and FIG. 9B showing flow charts for explaining a fourth character pattern generation process sequence in the character pattern generation apparatus according to the first embodiment of the present invention.
Figure 9:
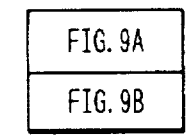
Figure 9B:
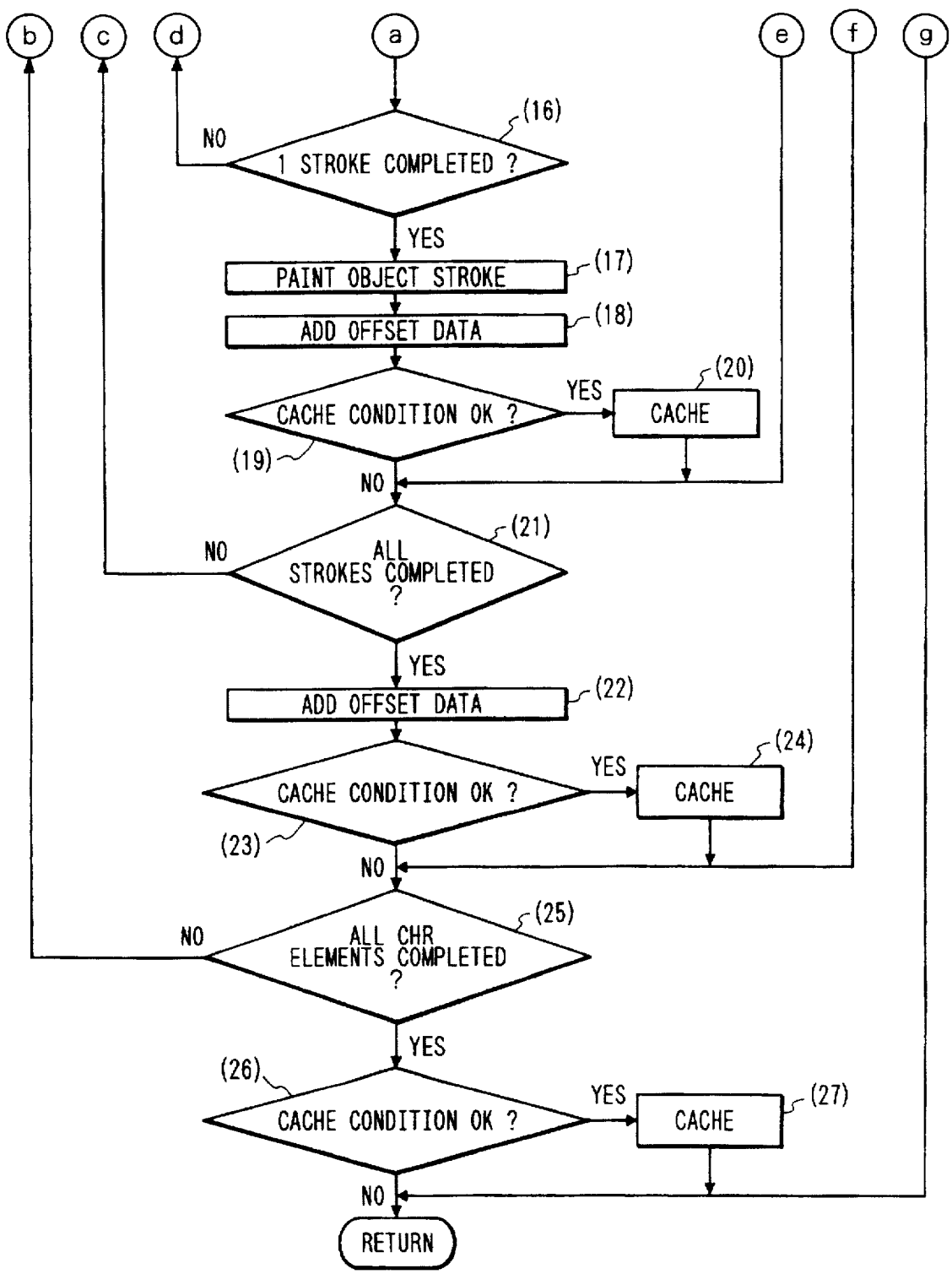

FIGS. 9A and 9B show flow charts showing a fourth character pattern generation process sequence in the character pattern generation apparatus according to the first embodiment of the present invention. Note that (1) to (27) indicate steps. Since the processes up to step (17) in FIG. 9B are the same as those up to step (17) in FIG. 8B showing the above sequence, a detailed description thereof will be omitted.

In the process of this sequence, it is checked if an input character has been cached. If the character has been cached, the cached data is used; otherwise, it is checked if one of the character elements constituting the character has been cached. If one of the character elements constituting the character has been cached, the cached data is used; otherwise, it is checked if one of the strokes constituting one of the character elements has been cached. If one of the strokes constituting one of the character elements has been cached, the cached data is used; otherwise, data of an object stroke is got to generate bit map data.

In step (18), an offset amount to the development position of the stroke in an object character element is added to the generated bit map data of the stroke. In step (19), it is checked if data is to be cached, as in the above embodiment. If Y in step (19), the data is cached in step (20).

In this manner, if it is determined in step (21) that one character element is generated, an offset amount to the development position of the character element in an object character is added to the bit map data of the character element in step (22).

It is then checked in step (23) if data is to be cached. If Y In step (23), the flow advances to step (24) to cache the data. Since the processes in step (25) and subsequent steps are the same as those in step (25) and subsequent steps in FIG. 8, a detailed description thereof will be omitted.

[Second Embodiment]

The second embodiment will be described below. Note that the arrangement of the apparatus of this embodiment is the same as that in the first embodiment, and a detailed description thereof will be omitted.

Figure 10:
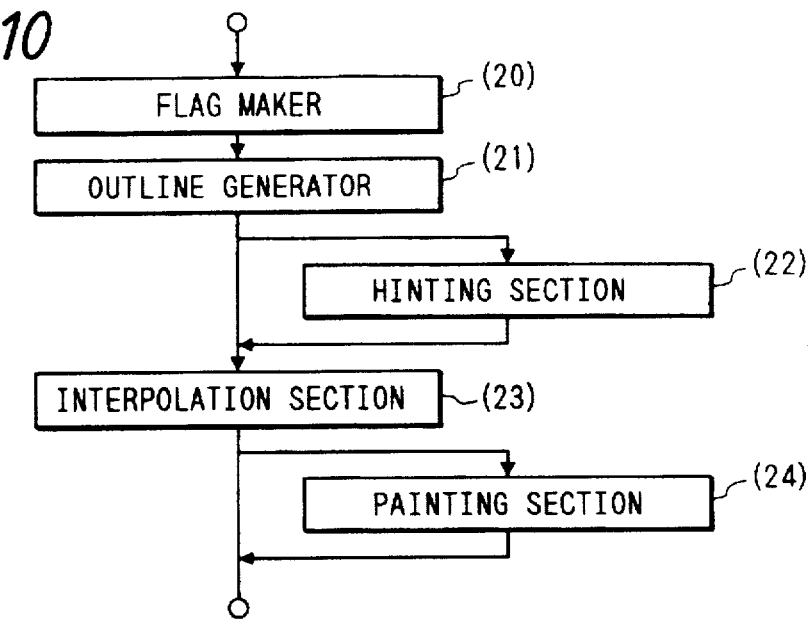
FIG. 10 is a block diagram for explaining the arrangement of a character pattern generation apparatus according to the second embodiment of the present invention.

FIG. 10 is a block diagram for explaining the arrangement of a character pattern generation apparatus according to the second embodiment of the present invention.

Referring to FIG. 10, a flag maker 20 sets a plurality of process selection flags based on a process selected by an operator using the KB 5 (FIG. 1), and registers the flags in correspondence with ID data, so that processes prepared in the character pattern generation apparatus can be automatically selected. With this process, by designating an ID, a required one of a plurality of processes can be reliably selected. In this embodiment, character data are stored in various font data formats such as outline and stroke formats as pattern generation methods of the character data, and in bezier and spline formats as curve generation methods of the character data. A required pattern generation method is selected from an outline generator 21 on the basis of the flag made by the flag maker 20 in correspondence with each character to be subjected to pattern generation.

In the character pattern generation apparatus with the above arrangement, the CPU 1 analyzes input character information, and makes a flag for selecting character pattern process resources to be utilized for generating a character pattern on the RAM 2, as will be described later. Then, a character pattern process (means to be executed by the CPU 1 in accordance with a sequence shown in the flow chart to be described later) selects different character pattern process resources on the basis of the made flag so as to generate a character pattern. In this manner, different character pattern generation processes are reliably performed by commonly using a plurality of character pattern process resources of the character pattern generation apparatus.

A character pattern is generated by selecting different character pattern process resources by the character pattern generation processing method on the basis of the made flag from character pattern process resources which include the outline generator 21 which comprises a plurality of font generation methods for processing character pattern generation in a stroke or outline format (these methods are executed by the CPU 1 in accordance with font data stored in the ROM 3; two types of font data, i.e., stroke and outline font data are prepared in this embodiment), a hinting section 22 which comprises a plurality of hinting processes for performing coordinate conversion for improving the quality of characters, an interpolation section 23 which has a plurality of interpolation processes for generating curves to form an outline pattern of a closed region, and a painting section 24 having a plurality of painting processes for painting the generated closed region to form bit map data. The generated character pattern is printed or displayed by the printer apparatus 7 or the display apparatus 9, thus reliably performing different character pattern processes using a plurality of common character pattern process resources of the character pattern generation apparatus.

As will be described below, the character pattern generation process of this embodiment uses three process sections, i.e., the hinting section 22, the interpolation section 23, and the painting section 24. Note that each section may comprise a logic circuit or may comprise a software arrangement executed by the CPU 1 based on a program stored in the ROM 2.

Each section has a plurality of process methods, and one of these methods is selected based on the flag.

The outline generator 21 generates outline data based on an outline generation method designated by the flag maker 20, and the hinting section 22 performs a hinting process designated by the flag maker 20. The interpolation section 23 performs interpolation using an interpolation method designated by the flag maker 20 to generate outline coordinate data. The painting section 24 performs painting by a method designated by the flag maker 20.

Note that the hinting section 22 and the painting section 24 are often not used.

Figure 11:
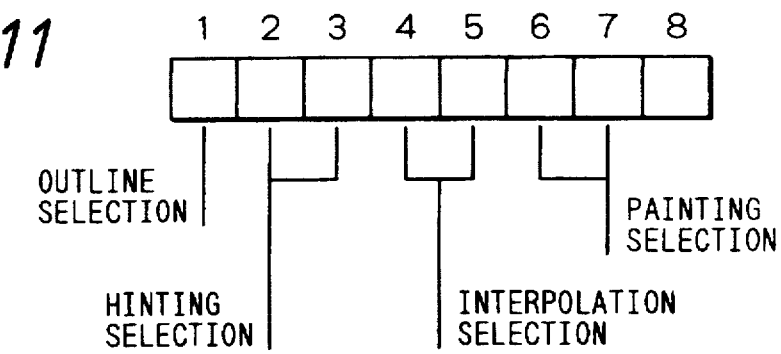
FIG. 11 is a view for explaining the flag making process of a flag maker 20 shown in FIG. 10.

FIG. 11 is a view for explaining the flag making process of the flag maker 20 shown in FIG. 10.

As shown in FIG. 11, the process selection flag has an 8-bit format, and its contents are as follows. The first bit is an outline selection bit for selecting a pattern generation method. The second and third bits are hinting selection bits for selecting an optimal one of a plurality of hinting methods prepared in advance in the hinting section 22. The fourth and fifth bits are interpolation selection bits for selecting an optimal one of a plurality of interpolation methods prepared in advance in the interpolation section 23. The sixth and seventh bits are painting selection bits for selecting an optimal one of a plurality of painting methods prepared in advance in the painting section 24. In this embodiment, flag information is constituted by 8 bits. However, the number of bits may be increased to increase the number of resources, and various modifications and combinations are available.

A case will be described below wherein the first bit, i.e., the outline selection bit of the process selection flag shown in FIG. 11 is ON.

Figure 12A:
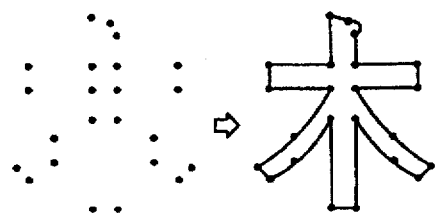
FIGS. 12A and 12B are views showing a character pattern generation method in a character pattern generation apparatus of this type.

When this outline selection bit is ON, character pattern generation is performed based on outline font data which expresses an outline of a character as coordinate data, and has no crossing points of strokes, as shown in FIG. 12A.

The process of the hinting section 22 shown in FIG. 10 will be described below with reference to the flow chart in FIG. 13.

Figure 13:
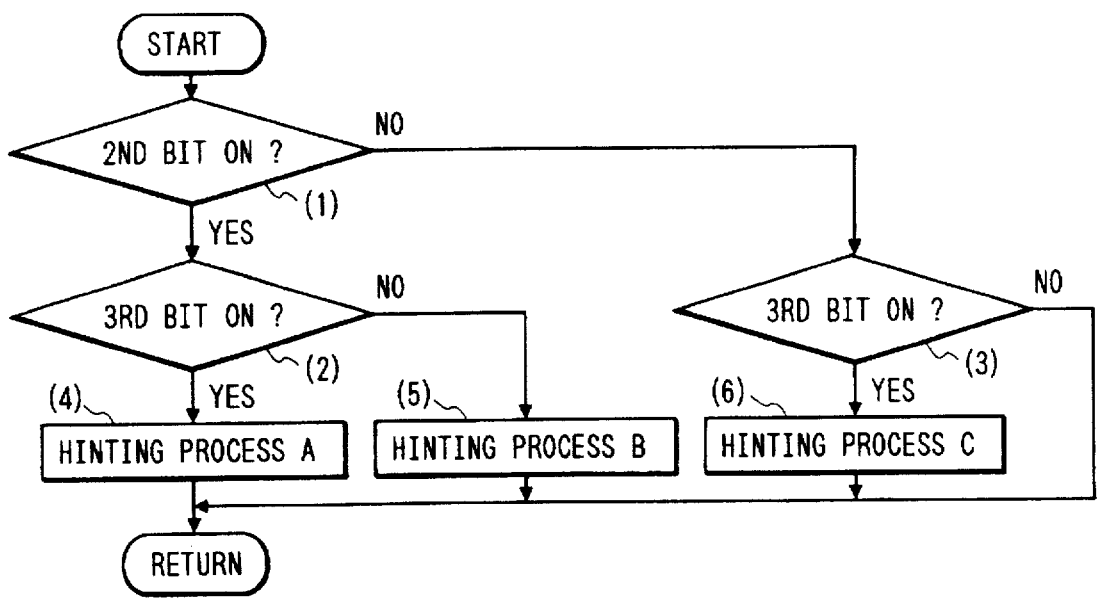
FIG. 13 is a flow chart for explaining the process operation of a hinting section shown in FIG. 10.

FIG. 13 is a flow chart for explaining the process operation of the hinting section 22 shown in FIG. 10. Note that (1) to (6) indicate steps.

In step (1), it is checked if the second bit of the process selection flag is ON. If Y in step (1), the flow advances to step (2) to check the third bit of the process selection flag in turn. If the third bit is ON, the flow advances to step (4) to perform a hinting process A as the process of the hinting section; otherwise, the flow advances to step (5) to perform a hinting process B. On the other hand, if it is determined in step (2) that the second bit of the process selection flag is not ON, the flow advances to step (3) to check the third bit of the process selection flag.

If the third bit of the process selection flag is ON, the flow advances to step (6) to execute a hinting process C as the process of the hinting section; otherwise, the hinting section 22 does not perform any hinting process.

The process operation of the interpolation section 23 shown in FIG. 10 will be described below with reference to the flow chart shown in FIG. 14.

Figure 14:
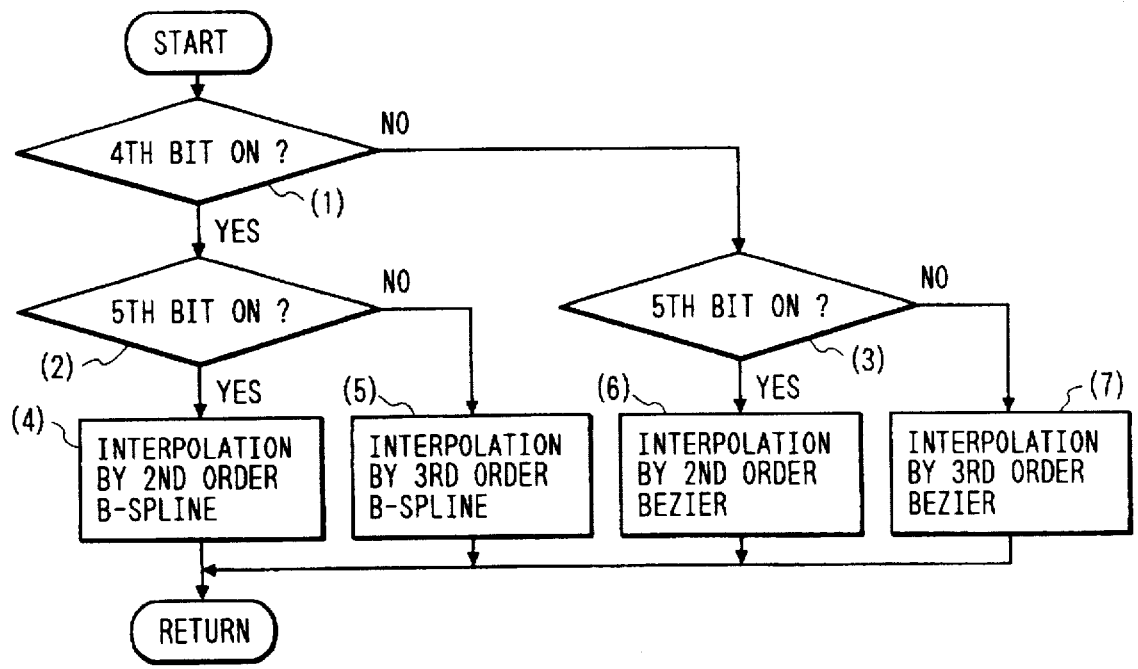
FIG. 14 is a flow chart for explaining the process operation of an interpolation section shown in FIG. 10.

FIG. 14 is a flow chart for explaining the process operation of the interpolation section 23 shown in FIG. 10. Note that (1) to (7) indicate steps.

It is checked in step (1) if the fourth bit of the process selection flag is ON. If Y In step (1), the flow advances to step (2) to check the fifth bit of the process selection flag in turn.

If the fifth bit is ON, the flow advances to step (4) to perform interpolation by 2nd-order B-spline as the process of the interpolation section 23; otherwise, the flow advances to step (5) to perform interpolation by 3rd-order B-spline.

If it is determined in step (1) that the fourth bit of the process selection flag is not ON, the flow advances to step (3) to check the fifth bit of the process selection flag. If the fifth bit of the process selection flag is ON, the flow advances to step (6) to perform interpolation by 2nd-order Bezier as the process of the interpolation section 23; otherwise, the flow advances to step (7) to perform interpolation by 3rd-order Bezier.

The interpolation methods prepared in the interpolation section 23 are 3rd-order Bezier, 2nd-order Bezier, 3rd-order B-spline, and 2nd-order B-spline, as described above, and are shown in FIGS. 15 and 16.

Figure 15:
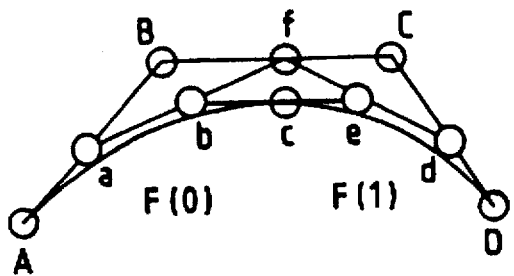
FIG. 15 is a view for explaining an example of an interpolation method of the interpolation section shown in FIG. 10.
Figure 16:
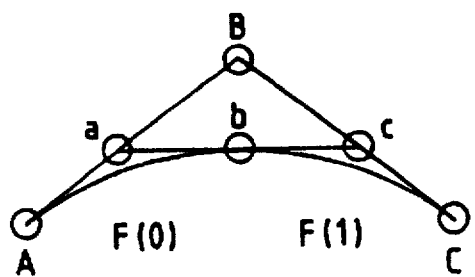
FIG. 16 is a view for explaining another example of an interpolation method of the interpolation section shown in FIG. 10.

FIGS. 15 and 16 are views for explaining the interpolation methods of the interpolation section 23 shown in FIG. 10. FIG. 15 corresponds to the 3rd-order Bezier interpolation process, and FIG. 16 corresponds to the 2nd-order Bezier interpolation process.

As shown in FIG. 15, middle points a, f, and e of line segments AB, BC, and CD are calculated in association with control points A, B, C, and D for generating one curve. For the currently calculated three points a, f, and e, middle points b and d of line segments af and fe, and a middle point c of a line segment bd are calculated. Of these calculated points, the points A, a, b, and c express a new curve F(0), and the points c, d, e, and D express a new curve F(1). By repeating this operation until a predetermined value is obtained, coordinate data representing one curve is generated.

The 2nd-order Bezier interpolation shown in FIG. 16 constitutes a curve by three points, while the 3rd-order Bezier interpolation constitutes a curve by four points. Then, middle points a and c of line segments AB and BC are calculated for control points A, B, and C, and a middle point of a line segment ac is calculated. Of the calculated points, the points A, a, and b constitute a curve F(0), and the points b, c, and C constitute a curve. By repeating this operation until a predetermined value is obtained, coordinate data representing one curve is generated.

In the B-spline interpolation, a curve is divided into a predetermined number of sections, and curves are generated based on a 2nd- or 3rd-order function unlike in bezier curve interpolation.

How to generate outline coordinate will be described below with reference to the flow chart shown in FIG. 17.

Figure 17:
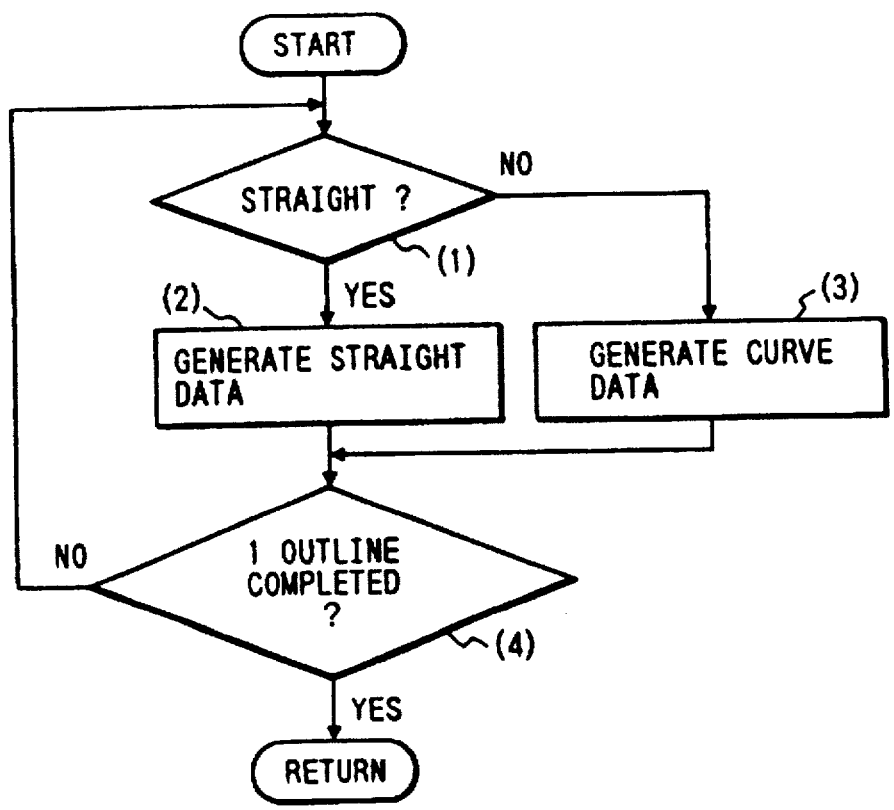
FIG. 17 is a flow chart showing an example of an outline process sequence using the interpolation section shown in FIG. 10.

FIG. 17 is a flow chart showing an example of an outline process sequence using the interpolation section 23 shown in FIG. 10. Note that (1) to (4) indicate steps.

In step (1), it is checked if got outline control points constitute a straight line. If Y in step (1), the flow advances to step (2) to generate straight data. If N in step (1), the flow advances to step (3), and curve data is generated by performing interpolation by a predetermined interpolation method selected in the process sequence shown in FIG. 14 based on the flag maker 20. After straight or curve data is generated in step (2) or (3), the flow advances to step (4) to check if coordinate data for one outline has been generated. If N in step (4), the flow returns to step (1).

On the other hand, if Y in step (4), the process of the interpolation section ends.

The process operation of the painting section 24 shown in FIG. 10 will be described below with reference to the flow chart shown in FIG. 18.

Figure 18:
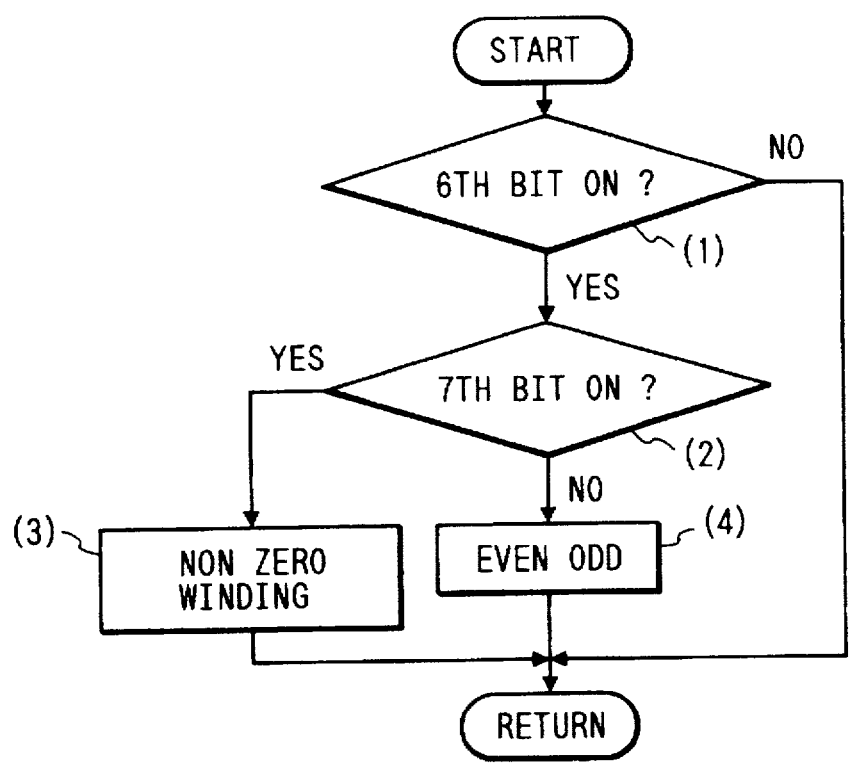
FIG. 18 is a flow chart showing an example of a painting process sequence by the painting section shown in FIG. 10.

FIG. 18 is a flow chart showing an example of the painting process sequence of the painting section 24 shown in FIG. 10. Note that (1) to (4) indicate steps.

It is checked in step (1) if the sixth bit (see FIG. 11) of the process selection flag is ON. If Y in step (1), the flow advances to step (2) to check the seventh bit of the process selection flag. If the seventh bit is ON, the flow advances to step (3) to perform a painting process by non zero winding (to be described in detail later) as the process of the painting section 24.

On the other hand, if it is determined in step (2) that the seventh bit is not ON, the flow advances to step (4) to perform a paint processing by even odd (to be described in detail later).

On the other hand, if it is determined in step (1) that the sixth bit of the process selection flag is not ON, the painting section 24 does not perform any painting process. With a series of operations described above, character generation based on one outline data is completed.

A case will be explained below wherein the first bit of the process selection flag is not ON.

Figure 12B:
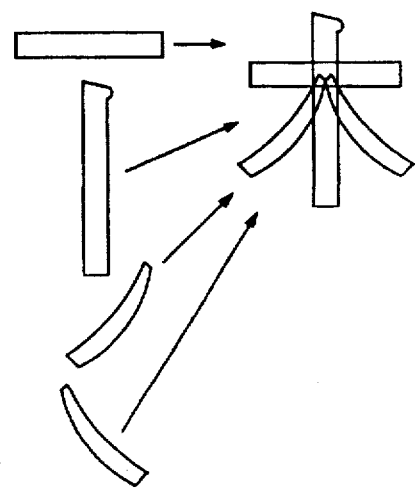

When the first bit of the process selection flag is not ON, patterns are generated in units of strokes, as shown in FIG. 12B, and are synthesized to generate a character. That is, character pattern generation by stroke synthesis is performed. The character pattern generation order by stroke synthesis follows the sequence shown in FIG. 19.

Figure 19:
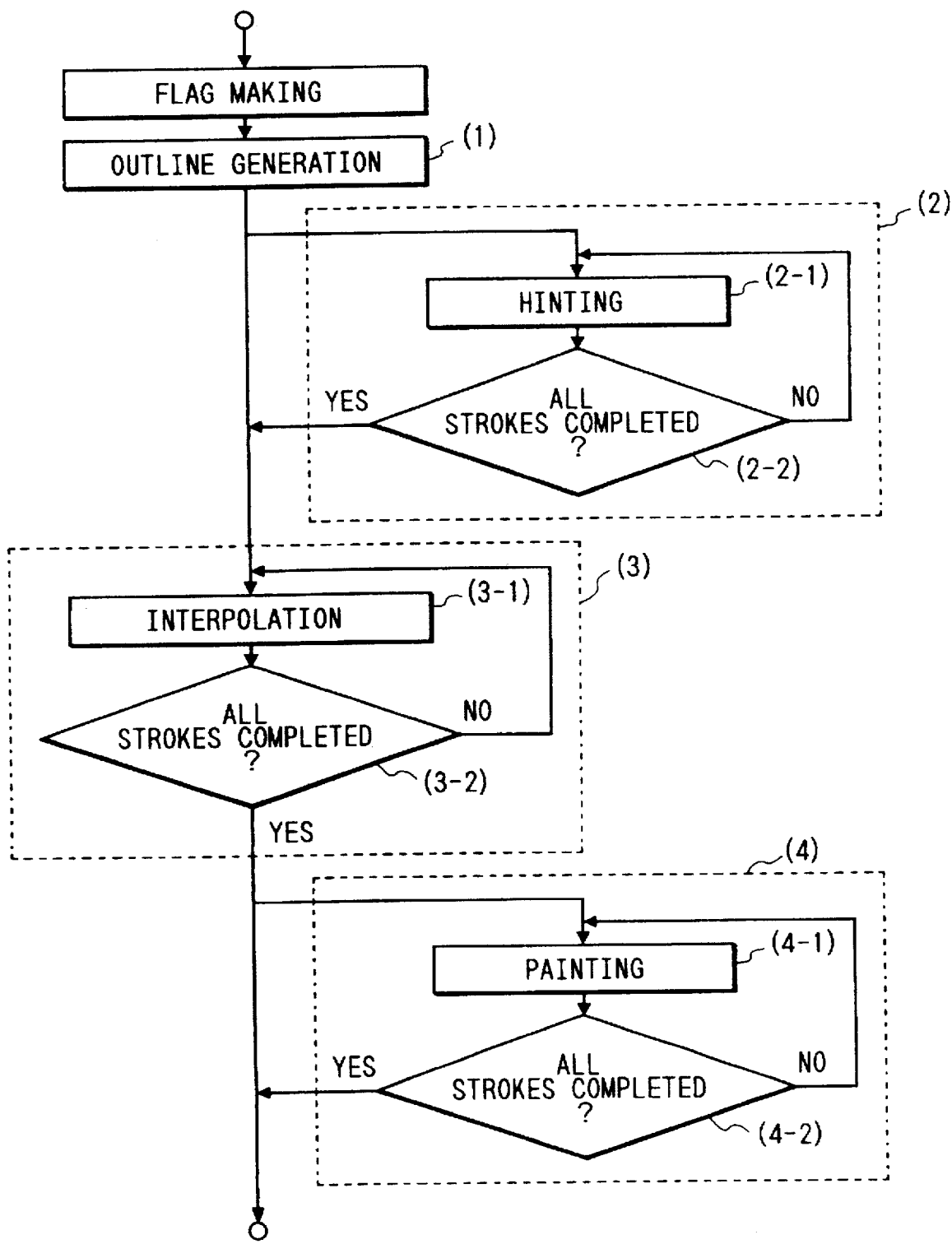
FIG. 19 is a flow chart showing an example of a second character pattern generation process sequence in the character pattern generation apparatus according to the second embodiment of the present invention.

FIG. 19 is a flow chart showing an example of a second character pattern generation process sequence in the character pattern generation apparatus according to the second embodiment of the present invention. Note that (1) to (4), (2-1), (2-2), (3-1), (3-2), (4-1), and (4-2) indicate steps.

In this case, since the functions and processes of the respective sections are substantially the same as those in character generation based on outline data, only different portions will be explained below.

First, data to be got is different. In the case of stroke synthesis, the total number of strokes constituting a character, and constituting points, positions, and size of each stroke are got.

The hinting section 22 performs the process based on FIG. 13, and the interpolation section 23 performs the process based on FIGS. 14 and 17. The processes in these sections are looped in correspondence with the number of strokes constituting an object character in steps (2-1), (2-2), (3-1), and (3-2), thus completing operations for all strokes in a single data transfer operation.

The process in the hinting section 22 is achieved by the same method as in the process method for one outline data. In the process of the interpolation section 23, each time coordinate data for one stroke is generated, the generated coordinate data is synthesized on a single table.

Figure 20:
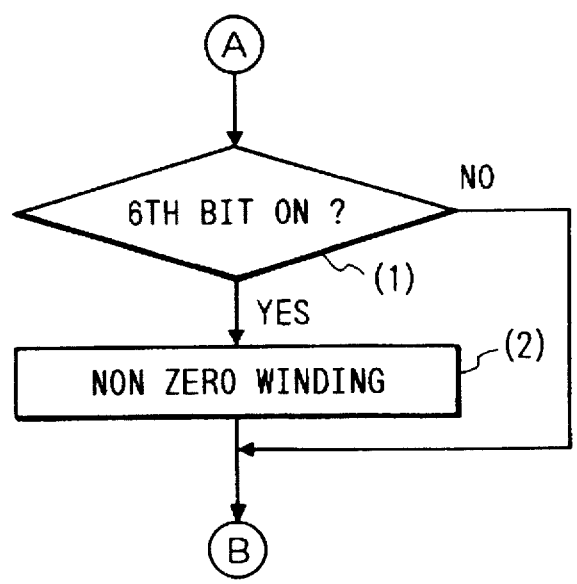
FIG. 20 is a flow chart showing an example of the detailed sequence of the painting process shown in FIG. 19.

In step (4), the painting section 24 performs the painting process according to the flow chart shown in FIG. 20.

FIG. 20 is a flow chart showing an example of the detailed sequence of the painting process shown in FIG. 19. Note that (1) and (2) indicate steps.

In step (1), the sixth bit of the process selection flag is checked. If the sixth bit is ON, the flow advances to step (2), and a painting process by non zero winding is performed as the process of the painting section 24.

On the other hand, if it is determined in step (1) that the sixth bit is not ON, the painting section 24 does not perform any painting process.

Figure 21A:
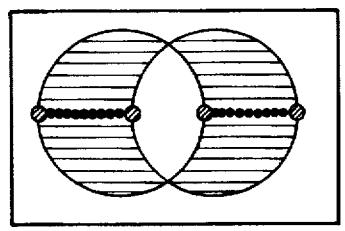
FIGS. 21A and 21B are views for explaining a painting method in the character pattern generation apparatus according to the present invention.
Figure 21B:
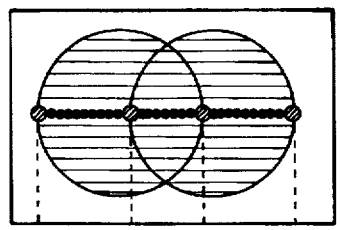
Figure 22:
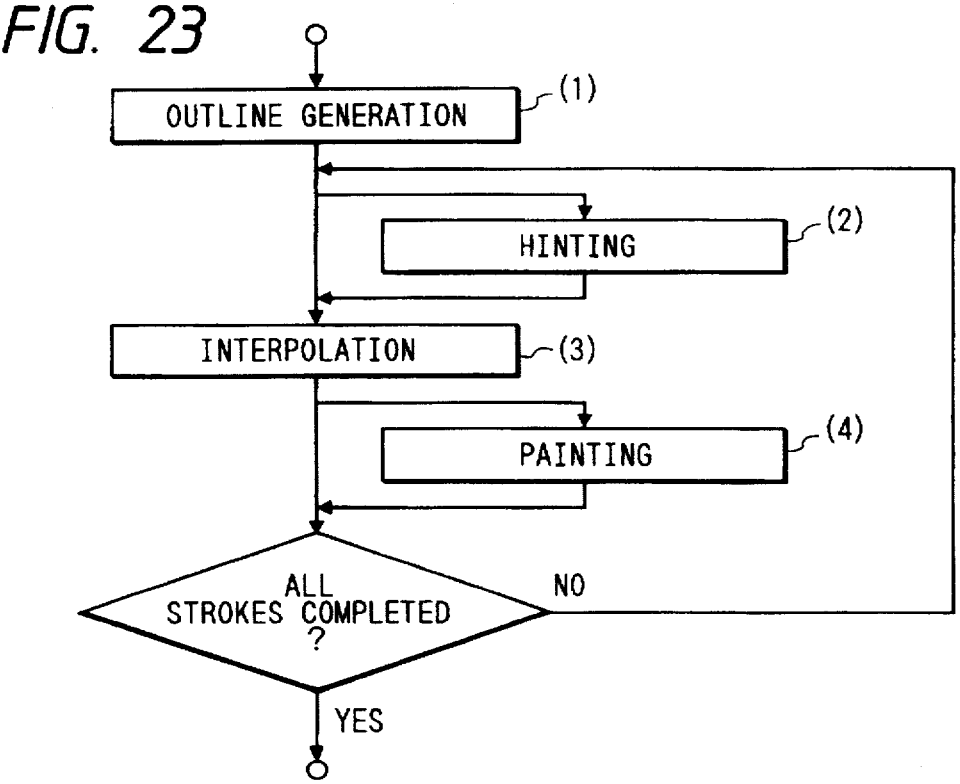
FIG. 22 is a view for explaining a painting method in the character pattern generation apparatus according to the present invention.

FIGS. 21A to 22 are views for explaining the painting methods in the character pattern generation apparatus according to the present invention.

As shown in FIGS. 21A and 21B, upon painting of patterns whose outlines cross like in stroke synthesis, if painting based on the even odd method is performed, a portion which is not painted may be generated. Since the even odd painting method horizontally checks bits in the X-axis direction, and turns on all bits between the first ON bit (value=1) and the next ON bit, if strokes overlap each other, a non-painted portion is generated, as shown in FIG. 21A. In the case of painting based on the non zero winding method, as shown in FIG. 21B, each of points (bits) constituting an outline is assigned with an attribute indicating whether the bit constitutes an upward or downward line. When the bit constitutes an upward line, the attribute is set to be 1; when the bit constitutes a downward line, the attribute is set to be −1. As in the even odd method, bits are checked in a direction parallel to the X-axis, and if an ON bit is detected, an attribute value is added. Bits are successively turned on as long as the sum value is not zero, thus attaining painting.

As shown in FIG. 22, upon painting of patterns whose outlines cross like in stroke synthesis, if painting based on the even odd method is performed, a portion which is not painted (non-painted portion HP) may be generated. For this reason, in the case of stroke synthesis, an available painting method is only the non zero winding method.

In the painting process of this embodiment, painting in stroke synthesis is performed by only the non zero winding method. A process which allows painting even by the even odd method will be explained below. Note that although the apparatus arrangement and the character pattern generation method based on outline font are the same as those in the above embodiment, a painting method in the character pattern generation method based on stroke synthesis is changed as follows.

In the second embodiment, the processes of all the strokes in both the hinting section 22 and the interpolation section 23 are completed in a single data transfer operation. However, in this case, the hinting section 22, the interpolation section 23, and the painting section 24 perform processes for one stroke in a single transfer operation. More specifically, at the time of completion of a single process of the painting section 24, bit map data of one stroke which has been painted is obtained. Another painting process will be described below with reference to FIGS. 23, 24, and 25.

FIG. 23 is a flow chart showing an example of another character pattern generation sequence in the character pattern generation apparatus according to the present invention. Note that (1) to (5) indicate steps.

Figures 24, 25:
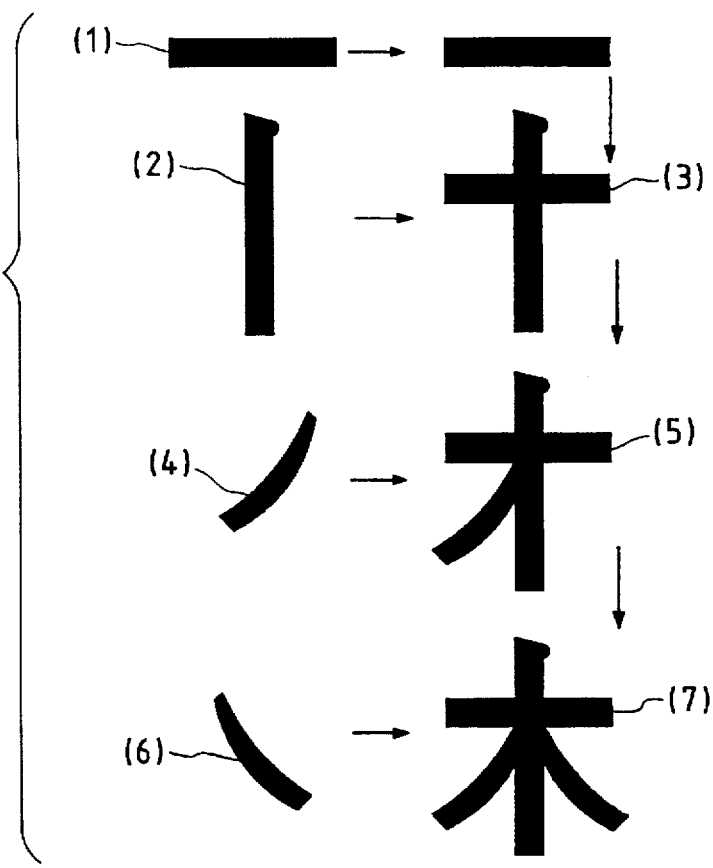
FIG. 24 is a view showing another character pattern generation state in the character pattern generation apparatus according to the present invention.
FIG. 25 is a table for explaining the correspondence between strokes and character elements of character patterns in the character pattern generation apparatus according to the present invention.

FIG. 24 is a view showing another character pattern generation state in the character pattern generation apparatus according to the present invention. Note that (1) to (7) indicate painting steps. FIG. 25 is a table for explaining the correspondence between strokes and character elements of character patterns in the character pattern generation apparatus according to the present invention.

As shown in FIG. 23, each time a painting process is completed in steps (1) to (5), it is checked if the processes are completed for all strokes constituting a character. If the processes are not completed, the process for the next stroke is repetitively performed.

A character generation process will be described below, taking " ★ " as an example. In the first process, a horizontal line pattern is generated, as shown in step (1). In step (2), a vertical line pattern as the next stroke is generated. In step (3), the vertical line pattern is synthesized with the horizontal line pattern generated in step (1).

In step (4), a left slant stroke pattern as the next stroke is generated. In step (5), the left slant stroke pattern is synthesized with the pattern generated in step (3). In step (6), a right slant stroke pattern as the next stroke is generated. In step (7), the right slant stroke pattern is synthesized with the pattern generated in step (5), thus generating a character pattern " ★ ". According to the process of the painting section in this method, painting can be performed by the two methods, i.e., non-zero winding and even-odd methods as in the case of outline font data.

[Another Embodiment]

Figure 26B:
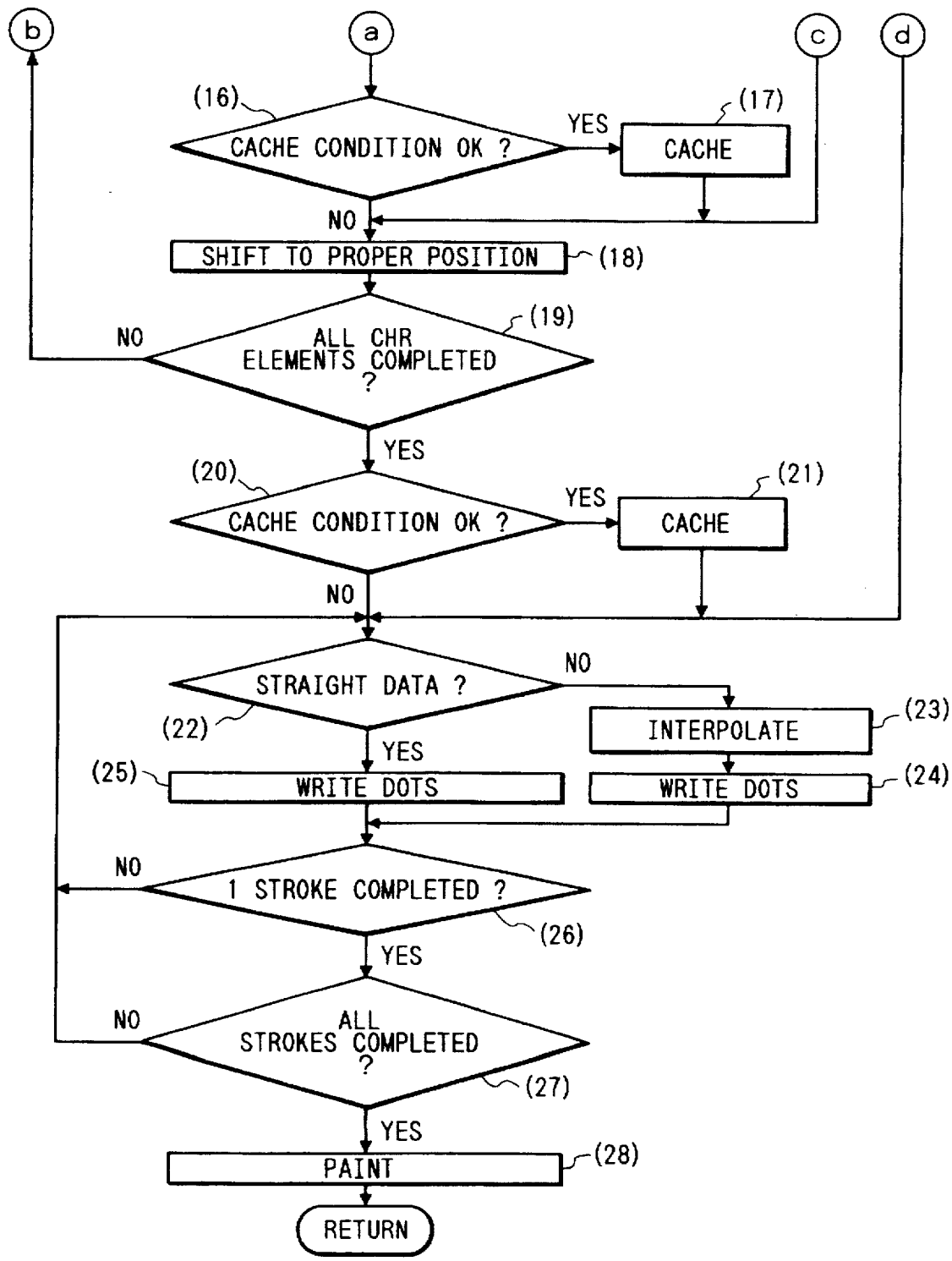
FIG. 26 is comprised of FIG. 26A and FIG. 26B showing flow charts for explaining a fifth character pattern generation process sequence in the character pattern generation apparatus according to the first embodiment of the present invention.

In the first and second character pattern generation sequences of the first embodiment, a case has been exemplified wherein outline coordinate data expressed by X- and Y-coordinates is cached, and in the third and fourth character pattern generation sequences of the first embodiment, a case has been exemplified wherein bit map data is cached. In this embodiment, a case will be exemplified wherein control point data is cached. FIGS. 26A and 26B show flow charts of a fifth character pattern generation process in the first embodiment. In step (1), it is checked by confirming the cache buffer based on ID data if coordinate data (control point data) in the outline format of a got object character to be developed has already been cached as a character. If corresponding character data is stored in the cache buffer, it is recognized that the data has already been cached, and the flow advances to step (2) to get coordinate data (control point data) in the outline format of an object character by stroke synthesis from the cache buffer. Thereafter, the flow advances to the entrance of step (22). If it is determined in step (1) that corresponding character data is not stored in the cache buffer, it is recognized that the data is not cached yet, and the flow advances to step (3) to get data of the number of character elements constituting the character and their types. The flow advances to step (4) to check by confirming the cache buffer based on ID data if coordinate data (control point data) in the outline format of an object character element of the character elements has already been cached. An object character element is selected from those constituting a character in an order of making strokes in this sequence. However, the present invention is not limited to this order. If corresponding character element data is stored in the cache buffer, it is recognized that the data has already been cached, and the flow advances to step (5) to get coordinate data (control point data) in the outline format of the object character element by stroke synthesis from the cache buffer. Thereafter, the flow advances to the entrance of step (18). If it is determined in step (4) that corresponding character element data is not stored in the cache buffer, it is recognized that the data is not cached yet, and the flow advances to step (6) to get data of the number of strokes constituting the object character element and their types. The flow then advances to step (7), and it is checked by confirming the cache buffer based on ID data if coordinate data (control point data) in the outline format of an object stroke has already been cached. At this time, an object stroke is selected from those constituting the character element in an order of making strokes in this sequence. However, the present invention is not limited to this order. If corresponding stroke data is stored in the cache buffer, it is recognized that the data has already been cached, and the flow advances to step (8) to get control point data of the object stroke from the cache buffer. Thereafter, the flow advances to the entrance of step (14). If it is determined in step (7) that corresponding stroke data is not stored in the cache buffer, it is recognized that the data is not cached yet, and the flow advances to step (9) to get coordinate data (control point data) in a stroke format of the object stroke. The flow then advances to step (10) to perform coordinate conversion of the got coordinate data (control point data) in the stroke format upon enlargement/reduction. Since the coordinate data in the stroke format is information defined by "core line"+"thickness", it is converted into coordinate data (control point data) in the outline format in step (11), as shown in FIG. 3. The flow then advances to step (12) to check if this stroke satisfies the cache condition. The cache condition test flow is shown in FIG. 4, and the cache buffer state at that time is shown in FIGS. 6A to 6C.

Referring back to FIG. 26, if it is determined in step (12) that the cache condition is satisfied, the flow advances to step (13) to cache data. The flow then advances to step (14), and the generated coordinate data (control point data) in the outline format of the object stroke or the coordinate data (control point data) in the outline format got in step (8) is shifted to the development position in an object character element. The flow advances to step (15) to check if the above-mentioned operation has been completed for all strokes constituting the object character element. If N in step (15), the flow returns to the entrance of step (7) to perform the same operation for the next object stroke. However, if Y in step (15), the flow advances to step (16) to check if this stroke satisfies the cache condition. The cache condition test flow is shown in FIG. 5, and the cache buffer state at that time is shown in FIGS. 6A to 6C. In step (1) in FIG. 5, it is checked if the buffer for storing the cached characters or character elements is already full of data. If the buffer is full of data, it is checked in step (2) in FIG. 5 if the priority of an object character or character element is higher than that of data stored in the cache buffer. If data with priority lower than that of the object character or character element is not stored in the cache buffer, the object character or character element is not cached. However, if at least one data with priority lower than that of the object character or character element is stored in the cache buffer, data with the lowest priority is deleted from the cache buffer, and the data of the object character or character element is stored in the cache buffer. Referring back to FIG. 26B, if the cache condition is satisfied, the flow advances to step (17) to cache data. The flow then advances to step (18), and the generated coordinate data (control point data) in the outline format by stroke synthesis or the coordinate data (control point data) in the outline format got in step (5) is shifted to the development position in an object character. In step (19), it is checked if the above-mentioned operation has been completed for all character elements constituting the character. If N in step (19), the flow returns to the entrance of step (4) to perform the same operation for the next object character element. However, if Y in step (19), it is checked in step (20) if this character satisfies the cache condition, as in step (16). If the cache condition is satisfied, the flow advances to step (21) to cache data. The flow then advances to step (22) to check if control point data is straight data, so as to interpolate an object stroke. If control point data is not straight data, curve data is determined, and interpolation is performed by a predetermined curve interpolation method in step (23). Thereafter, dots are written in step (24). If it is determined in step (22) that control point data is straight data, dots are written in step (25). It is then checked in step (26) if all dots for one outline of data of the object stroke have been written. If N in step (26), the flow returns to the entrance of step (22); otherwise, the flow advances to step (27) to check if the interpolation process has been completed for all strokes constituting the character. If N in step (27), the flow returns to the entrance of step (22); otherwise, the flow advances to step (28) to perform painting.

Figure 27B:
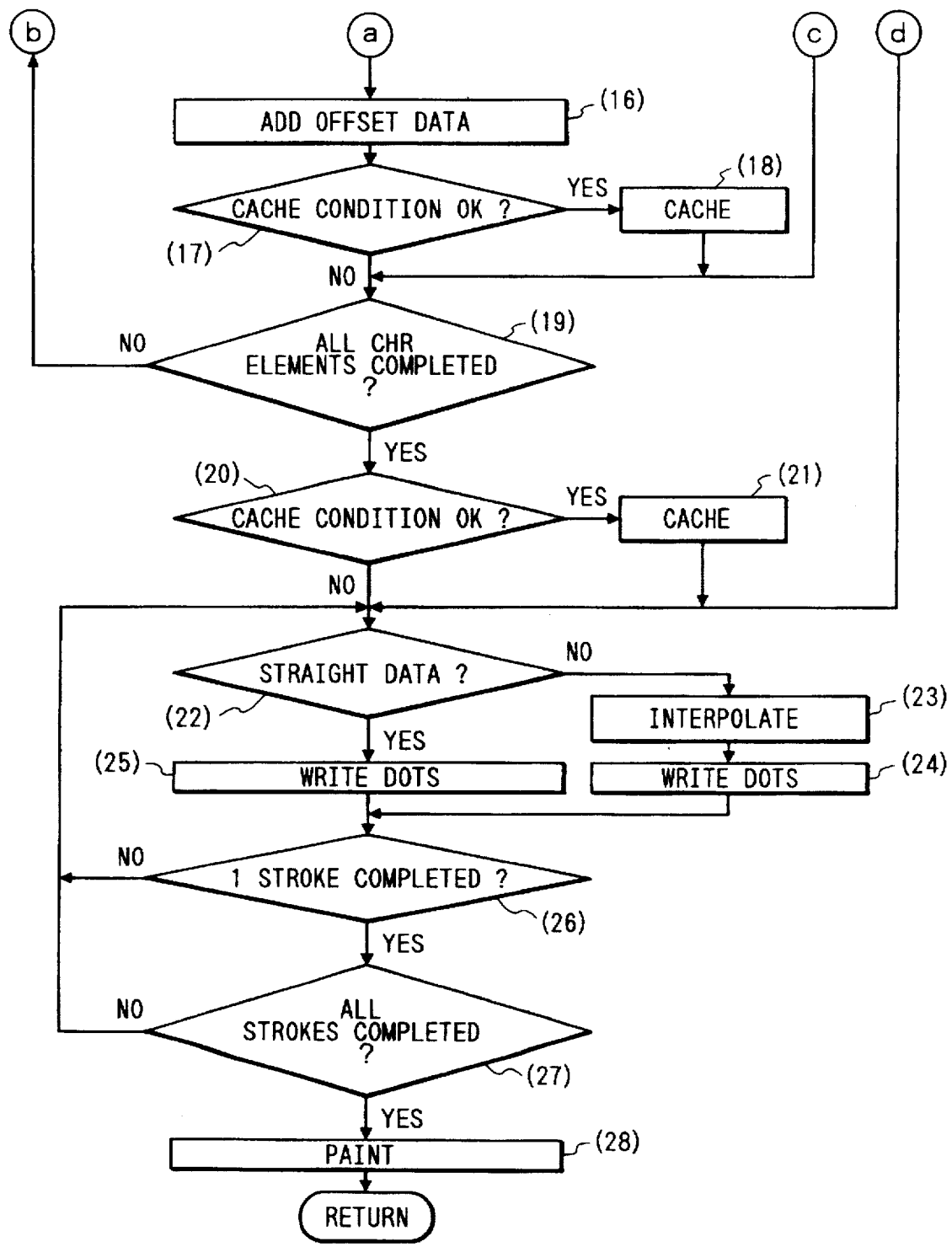
FIG. 27 is comprised of FIG. 27A and FIG. 27B showing flow charts for explaining a sixth character pattern generation process sequence in the character pattern generation apparatus according to the first embodiment of the present invention.

In the fifth character pattern generation sequence of the first embodiment, coordinate data (control point data) in the outline format of a character, stroke, and character element are cached. However, in a sequence to be described below, not only coordinate data (control point data) in the outline format but also an offset value to be added upon development in the above sequence are cached. More specifically, caching is performed to also cache position information indicating the development position of a stroke in a corresponding character element or the development position of a character element in a corresponding character, and a process for shifting data by an offset after development of cache data is not required unlike in the above sequence. FIGS. 27A and 27B show flow charts showing the process of this embodiment. The processes up to step (11) are the same as those up to step (11) in FIG. 26A showing the above sequence. More specifically, it is checked if coordinate data (control point data) in the outline format corresponding to a character has already been cached. If data has already been cached, the cached data is used; otherwise, it is checked based on ID data if coordinate data (control point data) in the outline format corresponding to one of character elements constituting the character has already been cached. If the data of one of the character elements constituting the character has already been cached, the cached data is used; otherwise, it is checked based on ID data if coordinate data (control point data) in the outline format corresponding to one of strokes constituting the character element has already been cached. If the data has already been cached, the cached data is used; otherwise, coordinate data (control point data) in a stroke format of the stroke is got to generate coordinate data (control point data) in the outline format. In step (12), an offset value to the development position of the stroke in an object character element is added to the generated coordinate data in the outline format of the stroke. In step (13), it is checked if data is to be cached, as in the above sequence. If data is to be cached, the data is cached in step (14). It is then checked in step (15) if the above-mentioned operation has been completed for all the strokes constituting the character element. If N in step (15), the flow returns to step (7); otherwise, the flow advances to step (16), and an offset amount to the development position of the character element in the object character is added. Then, it is checked in step (17) if data is to be cached. If data is to be cached, the flow advances to step (18) to cache data. The processes in step (19) and subsequent steps are the same as those in step (19) and subsequent steps in the fifth character pattern generation process of the first embodiment.

Figures 28, 28A:
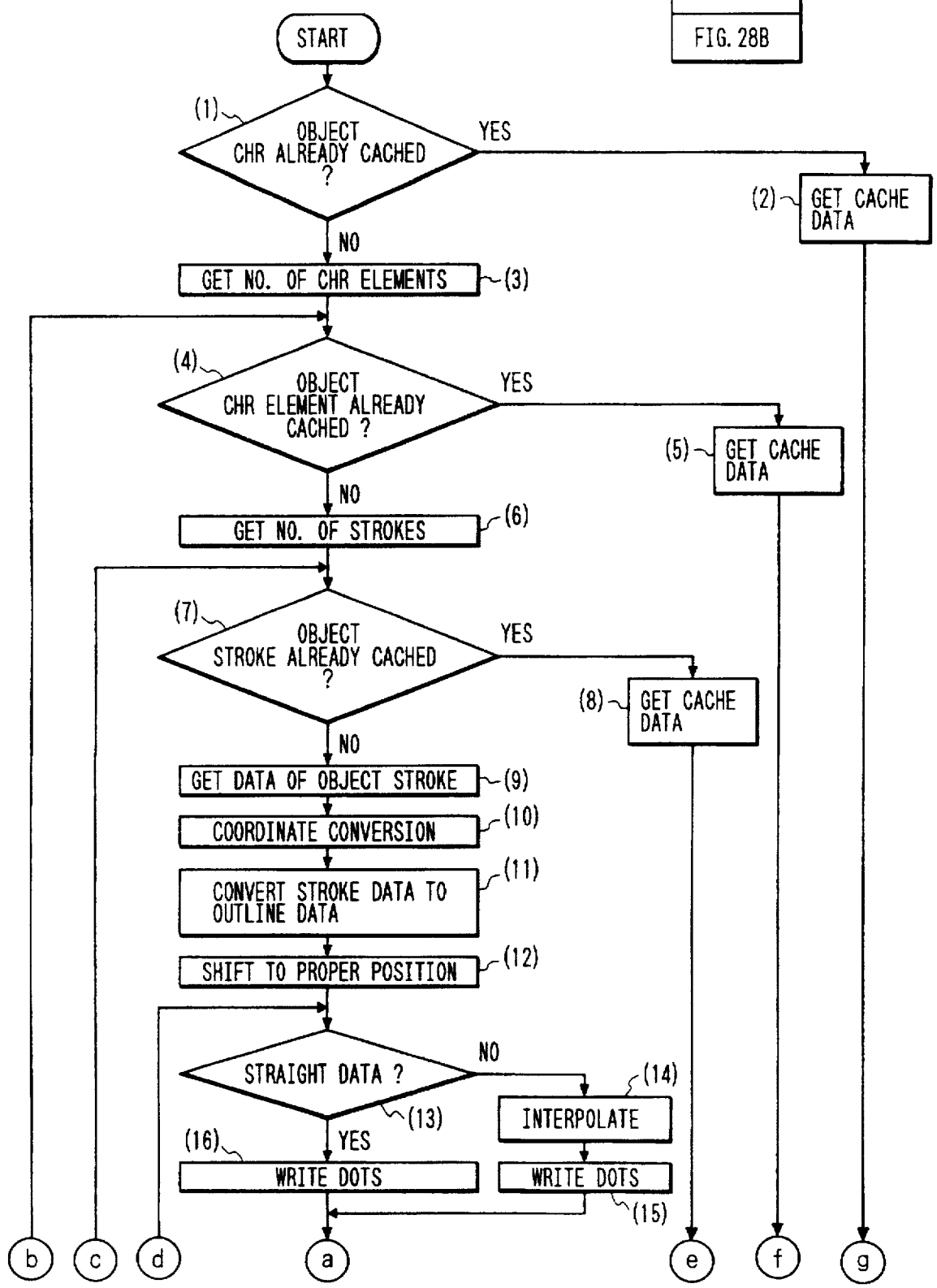
FIG. 28 is comprised of FIG. 28A and FIG. 28B showing flow charts for explaining a seventh character pattern generation process sequence in the character pattern generation apparatus according to the first embodiment of the present invention.
Figure 28B:
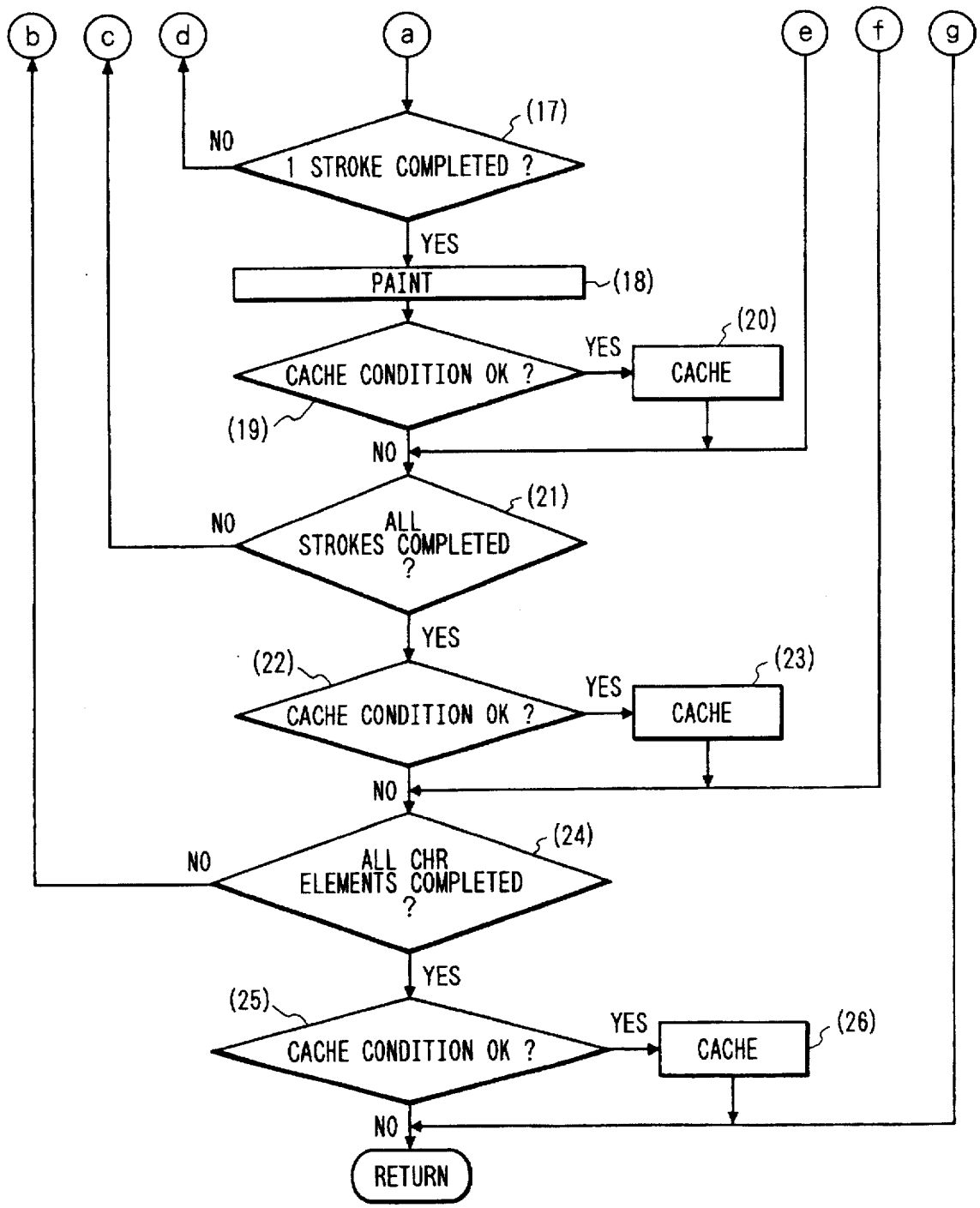

FIGS. 28A and 28B show flow charts showing a seventh character pattern generation sequence of the first embodiment. In step (1), data of an object character to be developed is got, and it is checked by confirming the cache buffer based on ID data if bit map data corresponding to the got character has already been cached. If corresponding character data is stored in the cache buffer, the flow advances to step (2) to get bit map data from the cache buffer. The flow then advances to the exit of step (25), thus ending generation of the object character. However, if it is determined in step (1) that corresponding character data is not stored in the cache buffer, the flow advances to step (3) to get data of the number of character elements constituting the character and their types. The flow advances to step (4) to check by confirming the cache buffer based on ID data if bit map data corresponding to an object character element has already been cached. At this time, an object character element is selected from those constituting a character in an order of making strokes in this sequence. However, the present invention is not limited to this order. If corresponding character element data is stored in the cache buffer, the flow advances to step (5) to get bit map data from the cache buffer, and thereafter, the flow advances to the entrance of step (24). However, if it is determined in step (4) that corresponding character element data is not stored in the cache buffer, the flow advances to step (6) to get data of the number of strokes constituting the object character element and their types. The flow then advances to step (7) to check by confirming the cache buffer based on ID data if bit map data corresponding to the object stroke has already been cached. At this time, an object stroke is selected from those constituting the character element in an order of making strokes in this sequence. However, the present invention is not limited to this order. If corresponding stroke data is stored in the cache buffer, the flow advances to step (8) to get bit map data from the cache buffer, and thereafter, the flow advances to the entrance of step (21). If it is determined in step (7) that corresponding stroke data is not stored in the cache buffer, the flow advances to step (9) to get coordinate data in a stroke format of the object stroke. The flow advances to step (10) to perform coordinate conversion of the got coordinate data in the stroke format upon enlargement/reduction. Since the coordinate data in the stroke format is information defined by "core line"+"thickness", it is converted into coordinate data (Control point data) in the outline format in step (11), as shown in FIG. 3. In step (12), the coordinate data corresponding to the stroke is shifted to the development position in the object character element. The flow advances to step (13) to check if the coordinate data is straight data. If the coordinate data is not straight data, curve data is determined, and interpolation is performed by a predetermined interpolation method in step (14). Thereafter, dots are written in step (15). However, if it is determined in step (13) that the coordinate data is straight data, dots are written in step (16). It is then checked in step (17) if all dots for one outline of outline coordinate data of the object stroke have been written. If N in step (17), the flow returns to the entrance of step (13); otherwise, the flow advances to step (18) to perform painting based on the outline coordinate data of the object stroke. The flow then advances to step (19) to check if this stroke satisfies the cache condition. The cache condition test flow is shown in FIG. 4, and the cache buffer state at that time is shown in FIGS. 6A to 6C.

Referring back to FIG. 28B, if it is determined in step (19) that the cache condition is satisfied, the flow advances to step (20) to cache data. The flow advances to step (21) to check if bit map generation and synthesis of all strokes constituting the object character element have been completed. If N in step (21), the flow returns to the entrance of step (7) to perform the same operation for the next object stroke. However, if Y in step (21), the flow advances to step (22) to check if this character element satisfies the cache condition. The cache condition test flow is shown in FIG. 5, and the cache buffer state at that time is shown in FIGS. 6A to 6C. In step (1) in FIG. 5, it is checked if the buffer for storing the cached characters or character elements is already full of data. If the buffer is full of data, it is checked in step (2) in FIG. 5 if the priority of an object character or character element is higher than that of data stored in the cache buffer. If data with priority lower than that of the object character or character element is not stored in the cache buffer, the object character or character element is not cached. However, if at least one data with priority lower than that of the object character or character element is stored in the cache buffer, data with the lowest priority is deleted from the cache buffer, and the data of the object character or character element is stored in the cache buffer. Referring back to FIG. 28B, if it is determined in step (22) that the cache condition is satisfied, the flow advances to step (23) to cache data. It is then checked in step (24) if bit map generation and synthesis of all character elements constituting a character have been completed. If N in step (24), the flow returns to the entrance of step (4) to perform the same operation for the next character element. However, if Y in step (24), it is checked in step (25) if this character satisfies the cache condition, as in step (22). If the cache condition is satisfied, the flow advances to step (26) to cache data. In this manner, pattern generation of the object character ends.

A control sequence which can automatically switch the first to seventh character pattern generation processes described in the first embodiment in accordance with the memory capacity (memory environment) will be described below with reference to FIG. 29.

Figure 29:
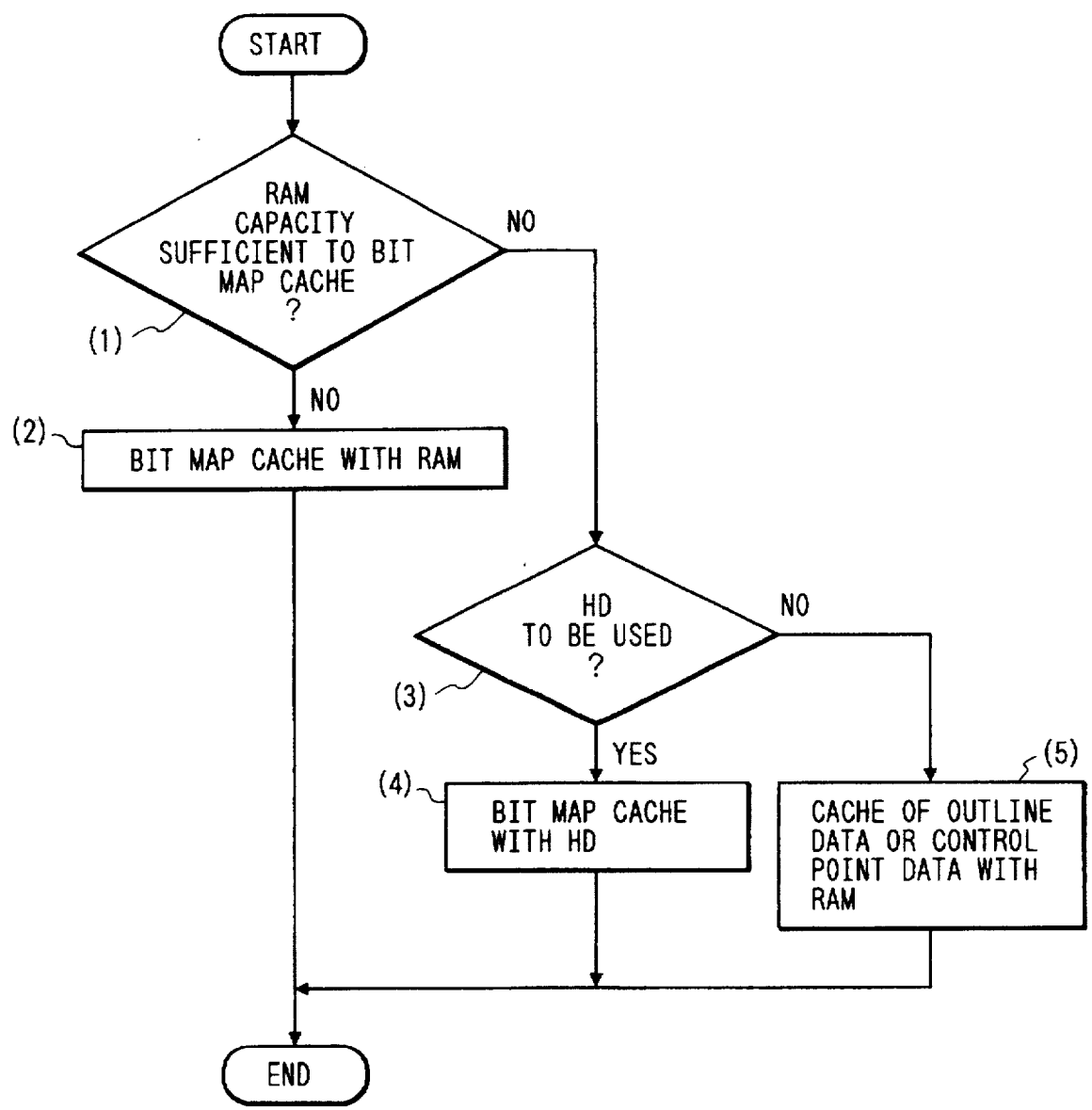
FIG. 29 is a flow chart for explaining an eighth character pattern generation process sequence in the character pattern generation apparatus according to the first embodiment of the present invention.

Whether the hard disk as an external storage device or the internal RAM is used as a storage device for caching is determined by discriminating in step (1) in FIG. 29 by checking the RAM capacity which can be used for caching in a system used if the capacity is sufficient for bit map caching. If Y in step (1), the flow advances to step (2), and bit map caching in units of strokes using the RAM is performed. However, if N in step (1), the flow advances to step (3), and it is checked if a hard disk is (can be) used as a system component. If Y in step (3), the flow advances to step (4), and bit map caching using the hard disk is performed. When a hard disk is not used (or cannot be used), the flow advances to step (5), and caching is performed in units of outline coordinate data or control point data using the RAM.

The caching in units of outline coordinate data or control point data using the RAM in step (5) may be performed as follows. If the RAM capacity is larger than a predetermined amount, caching may be performed in units of outline coordinate data; otherwise, caching may be performed in units of control point data. Alternatively, the bit map format, the outline coordinate format, or the control point format may be designated by a user by a command.

Note that determination in step (3) as to whether or not a hard disk is used is set by a user in accordance with the access time to the hard disk and the pattern development processing time (or automatically set by a system by calculations).

According to the above embodiments, by caching characters, character elements, and strokes, the number of processes for developing identical strokes, character elements, or characters upon generation of a large number of characters in document creation by stroke synthesis can be remarkably reduced.

When a plurality of character pattern process resources are prepared in advance in each apparatus, extra processes such as alteration or formation of the apparatus itself due to a difference in data or a change in process method can be eliminated, and character pattern generation can be efficiently performed.

Note that the present invention may be applied to either a system constituted by a plurality of equipments or an apparatus consisting of a single equipment. Also, the present invention may be applied to a case wherein the invention is achieved by supplying a program to the system or apparatus.

As described above, according to the present invention, since the cache means caches generated stroke, character element, and pattern data in the storage device, and a character pattern is generated by synthesizing the cached stroke, character element, and pattern data, the generation frequencies of strokes, character elements, and patterns with high use frequencies can be remarkably decreased, and character patterns can be efficiently generated.

According to the present invention, since the information generation means analyzes input character information and generates a flag for selecting character pattern process resources to be utilized for generating a character pattern, and the character pattern process means selects different character pattern process resources based on the generated flag to generate a character pattern, different character pattern processes can be performed by commonly using character pattern process resources which do not depend on input character information.

According to the present invention, a character pattern is generated by selecting different character pattern resources in the character pattern processing sequence on the basis of the generated flag from character pattern process resources, which include a plurality of font process sections for processing character pattern generation in units of strokes or outlines, a plurality of hinting sections for performing coordinate conversion for improving quality of a character by a method determined by the flag, a plurality of interpolation sections for generating a curve based on a curve characteristic determined by the flag, and generating an outline of a closed region, and a plurality of painting sections for generating a bit map by painting the closed region generated by the method determined by the flag. Therefore, different character pattern processes can be reliably achieved using a plurality of common character pattern process resources.

Therefore, repetition of identical jobs can be prevented, and a series of jobs in character pattern generation can be simplified. In addition, an extra labor due to a difference between specifications of font data and an apparatus can be eliminated.

In addition, the cache format can be selected in correspondence with the memory capacity.

Also, the cache format can be selected in accordance with a user's command.

What is claimed is:

1. A character pattern generation apparatus for generating a character pattern on the basis of font data in a stroke format, comprising:

data generation means for generating character data, character element data, and stroke data on the basis of the font data in the stroke format;

storage means for storing the character data, character element data, and stroke data generated by said data generation means;

discrimination means for (1) discriminating whether character data corresponding to a character pattern to be generated is stored in said storage means, (2) if the character data is not stored, discriminating whether character element data corresponding to the character pattern is stored in said storage means, and (3) if the character element data is not stored, discriminating whether stroke data corresponding to the character pattern is stored in said storage means; and character pattern drawing means for drawing the character pattern on the basis of the character data, character element data, or stroke data stored in said storage means in response to a discrimination by said discrimination means.

2. An apparatus according to claim 1, wherein the stroke data, character element data, or character data is data in a bit map format.

3. An apparatus according to claim 1, wherein the stroke data, character element data, or character data is control point information in an outline format converted from the font data in the stroke format.

4. An apparatus according to claim 1, wherein the stroke data, character element data, or character data is outline coordinate data generated from control point information.

5. An apparatus according to claim 1, further comprising output means for outputting the character pattern drawn by said character pattern drawing means.

6. An apparatus according to claim 5, wherein said output means comprises a printer.

7. An apparatus according to claim 5, wherein said output means comprises a display.

8. An apparatus according to claim 1, wherein the font data in the stroke format includes core line information and thickness information.

9. A character pattern generation method of generating a character pattern on the basis of font data in a stroke format, comprising the steps of:

generating character data, character element data, and stroke data on the basis of the font data in the stroke format;

storing the character data, character element data, and stroke data generated in said data generation step;

discriminating whether (1) character data corresponding to a character pattern to be generated is stored in said storing step, (2) if the character data is not stored, discriminating whether character element data corresponding to the character pattern is stored in said storage means, and (3) if the character element data is not stored, discriminating whether stroke data corresponding to the character pattern is stored in said storage means; and drawing the character pattern on the basis of the character data, character element data, or stroke data stored in said storage step in response to a discrimination by said discriminating step.

10. A method according to claim 9, wherein the stroke data, character element data, or character data is data in a bit map format.

11. A method according to claim 9, wherein the stroke data, character element data, or character data is control point information in an outline format converted from the font data in the stroke format.

12. A method according to claim 9, wherein the stroke data, character element data, or character data is outline coordinate data generated from control point information.

13. A method according to claim 9, further comprising the step of outputting the character pattern drawn in said character pattern drawing step.

14. A method according to claim 13, wherein said output step outputs the character pattern using a printer.

15. A method according to claim 13, wherein said output step outputs the character pattern using a display.

16. A method according to claim 9, wherein said discrimination step discriminates if said storage step stores character data, discriminates if said storage step stores character element data when it is determined that the character data is not stored, and discriminates if said storage step stores stroke data when it is determined that the character element data is not stored.

17. A method according to claim 9, wherein said character pattern generation step generates the character pattern on the basis of the character element data, stroke data, or font data in the stroke format when said storage step does not store character data, generates the character pattern on the basis of the stroke data or font data in the stroke format when said storage step does not store character element data, and generates the character pattern on the basis of the font data in the stroke format when said storage step does not store stroke data.

18. A method according to claim 9, wherein the font data in the stroke format includes core line information and thickness information.

19. A memory medium storing program instructions for performing a character pattern generation method of generating a character pattern on the basis of font data in a stroke format, comprising the steps of:

generating character data, character element data, and stroke data on the basis of the font data in the stroke format;

storing the character data, character element data, and stroke data generated in said data generation step;

discriminating whether (1) character data corresponding to a character pattern to be generated is stored in said storing step, (2) if the character data is not stored, discriminating whether character element data corresponding to the character pattern is stored in said storage means, and (3) if the character element data is not stored, discriminating whether stroke data corresponding to the character pattern is stored in said storage means; and drawing the character pattern on the basis of the character data, character element data, or stroke data stored in said storage step in response to a discrimination by said discriminating step.

20. A memory medium according to claim 19, wherein the stroke data, character element data, or character data is data in a bit map format.

21. A memory medium according to claim 19, wherein the stroke data, character element data, or character data is control point information in an outline format converted from the font data in the stroke format.

22. A memory medium according to claim 19, wherein the stroke data, character element data, or character data is outline coordinate data generated from control point information.

23. A memory medium according to claim 19, further comprising the step of outputting the character pattern drawn in said character pattern drawing step.

24. A memory medium according to claim 23, wherein said output step outputs the character pattern using a printer.

25. A memory medium according to claim 23, wherein said output step outputs the character pattern using a display.

26. A memory medium according to claim 19, wherein said discrimination step discriminates if said storage step stores character data, discriminates if said storage step stores character element data when it is determined that the character data is not stored, and discriminates if said storage step stores stroke data when it is determined that the character element data is not stored.

27. A memory medium according to claim 19, wherein said character pattern generation step generates the character pattern on the basis of the character element data, stroke data, or font data in the stroke format when said storage step does not store character data, generates the character pattern on the basis of the stroke data or font data in the stroke format when said storage step does not store character element data, and generates the character pattern on the basis of the font data in the stroke format when said storage step does not store stroke data.

28. A memory medium according to claim 19, wherein the font data in the stroke format includes core line information and thickness information.

29. A character pattern generation apparatus comprising:

a means for performing a first discrimination for discriminating whether character data corresponding to a character pattern to be generated is stored in a memory means;

a means for performing a second discrimination for discriminating whether character element data corresponding to a character element of the character pattern to be generated is stored in the memory means if said means for performing a first discrimination discriminates that the character data is not stored;

a means for performing a third discrimination for discriminating whether stroke data corresponding to a stroke of a character element of the character pattern to be generated is stored in the memory means if said means for performing a second discrimination discriminates that the character element data is not stored;

a means for performing a first control function for, if said means for performing a second discrimination discriminates that the character element data is stored in the memory means, generating character data on the basis of the stored character element data and causing the memory means to store the generated character data;

a means for performing a second control function for, if said means for performing a third discrimination discriminates that the stroke data is not stored in the memory means, generating stroke data on the basis of stroke font data and causing the memory means to store the generated stroke data, and generating character element data on the basis of the generated stroke data and causing the memory means to store the generated character element data, and generating character data on the basis of the generated character element data and causing the memory means to store the generated character data; and a means for performing a third control function for, if said means for performing a third discrimination discriminates that the stroke data is stored in the memory means, generating character element data on the basis of the stored stroke data and causing the memory means to store the generated character element data, and generating character data on the basis of the generated character element data and causing the memory means to store the generated character data.

30. An apparatus according to claim 29, wherein said means for performing a second discrimination discriminates whether character element data corresponding to all character elements of the character pattern to be generated is stored in the memory means and wherein said means for performing a third discrimination discriminates whether stroke data corresponding to all strokes of a character element of the character pattern to be generated is stored in the memory means.

31. A character pattern generation method comprising:

a first discrimination step for discriminating whether character data corresponding to a character pattern to be generated is stored in a memory means;

a second discrimination step for discriminating whether character element data corresponding to a character element of the character pattern to be generated is stored in the memory means if said first discrimination step discriminates that the character data is not stored;

a third discrimination step for discriminating whether stroke data corresponding to a stroke of a character element of the character pattern to be generated is stored in the memory means if said second discrimination step discriminates that the character element data is not stored;

a first control step for, if said second discrimination step discriminates that the character element data is stored in the memory means, generating character data on the basis of the stored character element data and causing the memory means to store the generated character data;

a second control step for, if said third discrimination step discriminates that the stroke data is not stored in the memory means, generating stroke data on the basis of stroke font data and causing the memory means to store the generated stroke data, and generating character element data on the basis of the generated stroke data and causing the memory means to store the generated character element data, and generating character data on the basis of the generated character element data and causing the memory means to store the generated character data; and a third control step for, if said third discrimination step discriminates that the stroke data is stored in the memory means, generating character element data on the basis of the stored stroke data and causing the memory means to store the generated character element data, and generating character data on the basis of the generated character element data and causing the memory means to store the generated character data.

32. A method according to claim 31, wherein said second discrimination step discriminates whether character element data corresponding to all character elements of the character pattern to be generated is stored in the memory means and wherein said third discrimination step discriminates whether stroke data corresponding to all strokes of a character element of the character pattern to be generated is stored in the memory means.

33. A memory medium storing program instructions for performing a character pattern generation method comprising:

a first discrimination step for discriminating whether character data corresponding to a character pattern to be generated is stored in a memory means;

a second discrimination step for discriminating whether character element data corresponding to a character element of the character pattern to be generated is stored in the memory means if said first discrimination step discriminates that the character data is not stored;

a third discrimination step for discriminating whether stroke data corresponding to a stroke of a character element of the character pattern to be generated is stored in the memory means if said second discrimination step discriminates that the character element data is not stored;

a first control step for, if said second discrimination step discriminates that the character element data is stored in the memory means, generating character data on the basis of the stored character element data and causing the memory means to store the generated character data;

a second control step for, if said third discrimination step discriminates that the stroke data is not stored in the memory means, generating stroke data on the basis of stroke font data and causing the memory means to store the generated stroke data, and generating character element data on the basis of the generated stroke data and causing the memory means to store the generated character element data, and generating character data on the basis of the generated character element data and causing the memory means to store the generated character data; and a third control step for, if said third discrimination step discriminates that the stroke data is stored in the memory means, generating character element data on the basis of the stored stroke data and causing the memory means to store the generated character element data, and generating character data on the basis of the generated character element data and causing the memory means to store the generated character data.

34. A memory medium according to claim 33, wherein said second discrimination step discriminates whether character element data corresponding to all character elements of the character pattern to be generated is stored in the memory means and wherein said third discrimination step discriminates whether stroke data corresponding to all strokes of a character element of the character pattern to be generated is stored in the memory means.

* * * * *

UNITED STATES PATENT AND TRADEMARK OFFICE
CERTIFICATE OF CORRECTION

PATENT NO. : 5,734,748
DATED : March 31, 1998
INVENTOR(S) : HIROYUKI AMANO

It is certified that error appears in the above-identified patent and that said Letters Patent is hereby corrected as shown below:

COLUMN 8

Line 18, "got" should read --used--.

COLUMN 10

Line 44, "got" should read --used--; and
    Line 56, "In" should read --in--.

COLUMN 12

Line 53, "In" should read --in--.

COLUMN 13

Line 32, "bezier" should read --Bezier--; and
    Line 61, "non zero" should read --non-zero--.

COLUMN 19

Line 11, "(Control" should read --(control--.

Signed and Sealed this

Twenty-seventh Day of October, 1998

Attest:

BRUCE LEHMAN

Attesting Officer    Commissioner of Patents and Trademarks